US010953328B1

(12) United States Patent
Schuster

(10) Patent No.: US 10,953,328 B1
(45) Date of Patent: Mar. 23, 2021

(54) DYNAMIC BATCHING INTERVAL ADJUSTMENT FOR GAME SESSION CREATION

(71) Applicant: Amazon Technologies, Inc., Seattle, WA (US)

(72) Inventor: Brian J Schuster, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/430,184

(22) Filed: Jun. 3, 2019

(51) Int. Cl.
*A63F 13/48* (2014.01)
*A63F 13/352* (2014.01)
*A63F 13/335* (2014.01)
*G06F 9/455* (2018.01)

(52) U.S. Cl.
CPC ............ *A63F 13/48* (2014.09); *A63F 13/335* (2014.09); *A63F 13/352* (2014.09); *G06F 9/45558* (2013.01); *A63F 2300/5513* (2013.01); *A63F 2300/5546* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,894,494 B2* | 11/2014 | Walker | A63F 13/33 463/42 |
| 2018/0089188 A1* | 3/2018 | Kharisma | G06F 16/9038 |
| 2019/0095478 A1* | 3/2019 | Tankersley | G06F 11/3006 |
| 2019/0236149 A1* | 8/2019 | Kuruvada | G06Q 10/063 |

* cited by examiner

*Primary Examiner* — Ronald Laneau
(74) *Attorney, Agent, or Firm* — Lee & Hayes, P.C.

(57) ABSTRACT

A game-hosting service of a service provider network is configured to dynamically adjust a batching interval used to assign processes to game session requests in batches of processes. The adjustment of the batching interval may be based on a level of contention resulting from operations to assign processes to game session requests. With the batching interval adjusted, the game-hosting service may queue one or more incoming game session requests received during the batching interval, query a data store for available processes after a lapse of the batching interval, assign ones of the available server processes to the game session request(s), and instruct the assigned processes to host corresponding game sessions. Dynamically adjusting the batching interval in this manner allows high volume games to benefit from added throughput, while lower volume games can benefit from quicker latency.

21 Claims, 10 Drawing Sheets

DYNAMIC BATCHING INTERVAL ADJUSTMENT FOR GAME SESSION CREATION

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide users with on-demand delivery of compute power, database storage, applications, and other resources, rather than the users having to make upfront investments in hardware and spend time and resources managing the hardware.

Often, users that subscribe to the service provider for use of computing resources in the service provider network also provide products or services to their own clients. For example, the service provider network may provide a game-hosting service to game developers that deploys, operates, and scales session-based game servers in the service provider network for clients of the game developers. In this way, a game developer that has developed an online game may host their session-based, online game using virtual machine (VM) instances running on servers of the service provider network that are accessible by clients of the game developer.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
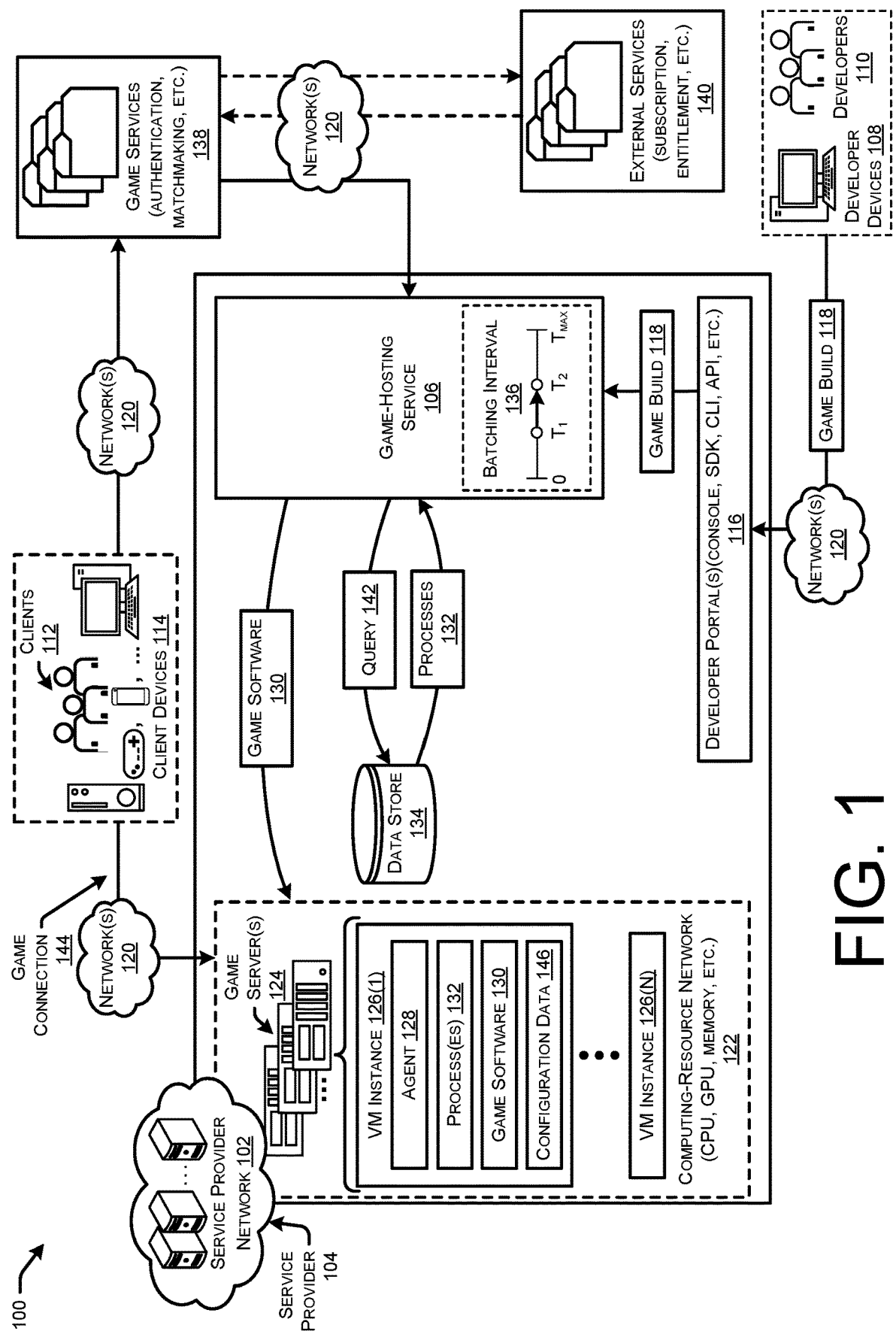
FIG. 1 illustrates a system-architecture diagram of an example environment in which a game-hosting service of a service provider network can dynamically adjust a batching interval used to assign processes to game session requests in batches of processes.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (or "subscribers") need not invest in and maintain the computing infrastructure required to implement the various services that they may need. Additionally, subscribers and their clients are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide subscribers with scalable, on-demand, and network-accessible computing platforms over large geographic regions such that the subscribers have readily-available VM instances at their disposal. These service provider networks allow subscribers to immediately have computing infrastructure over large geographic regions to fulfill individual computing needs of the subscriber, and also to provide computing resources to support services provided to clients of the subscribers.

For example, a subscriber to the service provider network may be a game developer (e.g., individual, company, and/or other organization) that has developed an online game that they would like to provide to clients who desire to play the online game. However, the game developer may desire to provide access to their online game to clients over large geographic regions, and for large amounts of users. The amount of computing infrastructure (e.g., compute power, memory, storage networking, security, etc.) used to support and maintain an online gaming platform over different geographic regions that hosts game sessions for clients may be large enough to be impractical for game developers, particularly new or emerging game developers, to purchase and maintain on their own.

Accordingly, service provider networks may provide a game-hosting service that is a fully, or at least partially, managed online gaming platform. The game-hosting service may deploy, operate, and scale session-based online game servers in the service provider network on behalf of game developers. The game-hosting service may provide groups, or "fleets," of virtual machine instances (e.g., VM instances, instances, etc.) that execute on computing resources of the service provider network and host game sessions for clients of a subscribing game developer. Game software included in a game build can be provisioned to a fleet of instances, and the game-hosting service may spin up the fleet of instances, where each instance in the fleet executes at least one process that is to host a game session. When clients of a game developer want to play a game that is hosted by a game-hosting service, the game-hosting service may be tasked with assigning server processes—which are to be used for hosting the server component of the game—to incoming game session requests. Because this assignment process is typically performed for each game session request upon receipt of the request, contention can arise between assignment operations, especially when the throughput of incoming game session requests increases. For example, when the game-hosting service starts receiving upwards of 50 to 100 game session requests per second, the competition for computing resources to host those game sessions inherently increases, which gives rise to contention in the form of assignment failures if the system is attempting to assign server processes to the incoming game session requests using a common pool of server processes. When this contention spikes, it can degrade the performance of the game-hosting service. Traditional approaches to dealing with this contention, such as sharding, help mitigate contention, but they come with a drawback of fragmenting the set of available processes.

This disclosure describes, among other things, techniques and systems implemented by a game-hosting service of a service provider network to dynamically adjust a batching interval used to assign processes to game session requests in batches of processes. Before processes are assigned to game sessions (or the corresponding game session requests), the processes execute in an idle mode on a fleet of the subscriber. The game-hosting service can utilize the batching interval to assign these idle processes to incoming game session requests in batches of processes. That is, the game-hosting service may queue one or more incoming game session requests received during the batching interval, and, after a lapse of the batching interval, may query a data store for a number of available processes to assign to the queued game session request(s). The game-hosting service may then assign ones of the available server processes to the game session request(s), and may instruct the assigned process(es) to host corresponding game session(s).

Adjustment of the batching interval may be based on a level of contention (as determined from collected contention data) resulting from operations to assign processes to game session requests. For example, the game-hosting service may periodically or continuously receive contention data relating to operations that are performed to assign processes to game session requests, and may determine, based at least in part on the contention data, a level of contention resulting from the assignment operations. In some embodiments, the level of contention is determined as a number or a percentage of failed attempts to assign processes to game session requests over a time period. This is because, when contention is high, competition for available processes is also high, which results in a relatively high number of failed attempts to assign processes to game session requests caused by those processes having been already assigned to another game session request. Based on the level of contention, the game-hosting service may adjust (e.g., increase or decrease) the batching interval to a new value (e.g., a period of time). The value of the batching interval defines the frequency at which a data store is queried for available processes that are to be assigned in batch to a queue of game session requests received during the previous batching interval.

Adjusting the batching interval up or down in this manner allows for accumulating a respectively larger or smaller set of game session requests in a queue before a set of processes are assigned, in batch, to the accumulated game session requests. In general, this batching approach increase efficiency of the assignment operations, as compared to individually querying the data store for each game session request in order to assign a process to that game session request. That is, because the number of operations involved in assigning a batch of processes to corresponding game session requests is reduced from many operations (e.g., when individual queries are submitted for each game session request) to a single operation, this has the effect of reducing the contention that would otherwise result from the assignment operations. Increasing the batching interval to a longer duration is, therefore, likely to decrease the level of contention, which may arise when there is an increase in game session request throughput coupled with a relatively short batching interval. This dynamic adjustment of the batching interval thereby allows high volume games to benefit from added throughput, while lower volume games can benefit from quicker latency, which would not be possible with a static (non-adjustable) batching interval.

An example process implemented by one or more computing devices of a game-hosting service for adjusting a batching interval may include determining a level of contention resulting from operations to assign processes to game session requests, and adjusting, based at least in part on the level of contention, a batching interval from a first period of time to a second period of time. With the batching interval adjusted, the process may further include queuing multiple game session requests received during the batching interval, and, after a lapse of the second period of time of the batching interval, querying a data store for a number of available processes that is greater than or equal to a number of the multiple game session requests. At least some of these available processes may then be assigned to the multiple game session requests as assigned processes, and the assigned processes may be executed to host game sessions that correspond to the game session requests.

By dynamically adjusting the batching interval—which is used to assign processes to game session requests in batches of processes, a game-hosting service can determine, based at least in part on observed contention resulting from the process-to-session assignment operations, when, and/or how fast, and/or by how much, to increase the batching interval for purposes of mitigating the observed contention. The game-hosting service can also determine when, and/or how fast, and/or by how much, to decrease the batching interval when the observed contention subsides. This helps provide a game-hosting service that maintains an acceptable performance level for clients that are playing games hosted by the game-hosting service. The performance level is maintained by dynamically adjusting the batching interval of the process-to-session assignment operations to mitigate contention, as needed. This mitigation of contention prevents computing resources from being overleveraged and thereby avoids degradation in the system's performance when hosting game sessions for subscribers and their clients.

While some of the techniques are described herein as being performed in a service provider network of a service provider, the techniques may similarly be applied in other computing networks, such as on-premise servers managed by the game developers themselves. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a game-hosting service of a service provider network 102 can dynamically adjust a batching interval used to assign processes to game session requests in batches of processes.

As illustrated, the service provider network 102 may be operated and/or managed by a service provider 104. The service provider network 102 may provide various services to users to fulfill their computing resource needs, such as cloud-based computing resources. For example, the service provider network 102 may provide cloud-based, scalable, and network accessible compute power services, storage services, database services, and/or other services. As illustrated, the service provider network 102 may also provide a game-hosting service 106 that is a scalable, cloud-based runtime environment for online games, including session-based multiplayer games. The game-hosting service 106 may be fully managed by the service provider 104 and deploy, operate, and scale the session-based multiplayer game servers in the cloud-based, or network-based, environment. For example, the game-hosting service 106 may not only provide the hardware to host the game sessions, but also manage ongoing activity, security, storage, and performance tracking. Additionally, the game-hosting service 106 may provide auto-scaling capabilities such that instances supporting game sessions can be spun up or spun down based on player demand.

To utilize the game-hosting service 106, developers 110 may utilize developer devices 108 to register for an account (e.g., a user account, subscriber account, etc.) with the game-hosting service 106. This may allow the developers 110 (sometimes referred to herein as "subscribers" 110) to subscribe to the game-hosting service 106, provide a game build(s) for their online game(s), and to provide their clients 112 with access to the online game(s) via their client devices 114 without the developers 110 having to invest in the computing resources (e.g., on-premise resources) needed to host the online game sessions for their clients 112. In order to utilize the game-hosting service 106, the developers 110 may provide a game build 118 to the game-hosting service 106 via one or more developer portals 116. The developer portal(s) 116 may include one or more of a web-based console, a software-development kit (SDK), a command-line interface (CLI), an application programming interface (API), and/or any other means by which a developer 110 may specify and/or provide a game build 118 to the game-hosting service 106.

The game build 118 may correspond to any type of online game that may host a game session for one or more clients 112 (sometimes referred to herein as "players" 112). For instance, the game build 118 may correspond to a session-based single player online game, or a session-based multi-player online game. The game build may represent any type of online game, such as real-time strategy (RTS) games, first person shooter (FPS) games, multiplayer online battle arena (MOBA) games, role playing (RPG) games, massively multiplayer online (MMO) games, massively multiplayer online role player games (MMORPG), virtual board games (e.g., chess, checkers, etc.), action-adventure games, simulation games, strategy games, sports games, virtual reality games, and/or any other game that may be played in an online environment.

Generally, the client devices 114 may comprise any type of computing device that may be utilized for online gaming. For instance, the client devices 114 may include laptop computing devices, desktop computing devices, mobile phones, gaming systems, controller-based devices, virtual and/or augmented reality devices (e.g., head-mounted displays (HMDs)), other wearable devices, biometric sensors, projectors, televisions, and/or any computing device usable on its own, or in conjunction with other devices, for online gaming. In some examples, at least part of the online game may execute and/or be stored locally on the client devices 114.

The game build 118 may include the game software for the online game, and may further include server executables, supporting assets, libraries, and dependencies that are all used to host and/or execute the game software on an instance. The developers 110 may provide the game build 118 through the developer portal(s) 116, such as by uploading the game build 118 over one or more networks 120 (e.g., the Internet, wireless wide area networks (WANs), personal area networks (PANs), wired and/or wireless local area networks (LANs), etc.). The network(s) 120 may comprise any type of network or combination of network, including wired and/or wireless networks. Once a developer 110 has uploaded their game build 118, the game-hosting service 106 may deploy the game software 130 to one or more game servers 124 in a computing-resource network 122. For instance, the game software 130 may be installed on one or more virtual machine (VM) instances 126 that are at least partially managed by a local agent 128 (e.g., script, program, application, etc.).

The computing-resource network 122 may include data centers that each include one or more computing resources, such as VM instances 126(1) to 126 (N) where "N" is any integer greater than or equal to 2 (referred to herein collectively as "VM instances 126" "or just "instances 126"). The data centers may house the game server(s) 124 and may be located across disparate geographical regions such that computing resources are available to support functionality for cloud-based services provided by the service provider network 102. The computing resources may include various combinations of hardware-based components, such as central processing units (CPU), graphics processing units (GPU), memory, storage, network capacity, security, and/or any other type of hardware-based resource to support cloud-based services, such as the game-hosting service 106. In some examples, the computing resource network 122 may further include respective memories that store various firmware-based and/or software-based resources that provide the functionality of the services, such as the instances 126 on which an agent 128 executes, the game software 130 executes, and one or more processes 132 execute to support a game session.

Generally, the agent 128 may be responsible for handling various processes on an instance 126, such as spinning up an instance 126, spinning down an instance 126, handling lifetime processes of the instance 126, retrieving game session assignments for processes 132 executing on the instance 126, executing processes 132 on the instance 126 to host a game session, managing resources of the instance 126, installing patches and/or other software on the instance 126 and/or various other actions for managing the instance 126. The data store 134 may, among other things, keep track of the processes 132 that are executing on VM instances 126 across subscribers' 110 fleets, and the ownership of those processes 132 in terms of whether they are available (e.g., executing in idle mode without an owner), or already assigned to a game session (or game session request).

In some examples, each process 132 (sometimes referred to as a "server process" 132) that executes on an instance 126 may support a game session that engages one or more clients via their client device(s) 114. That is, each process 132 may support one game session. For instance, the process(es) 132 may each be running the game software 130 to support a game session for one or more clients 112. Often, a process 132 supports a game session for multiple clients 112 (e.g., as with a multi-player game). A game session is an instance of the game software 130 running on a server that clients 112 can connect to and interact with. The game defines the basic characteristics of the game session, such as the life span or the number of players involved. Although many of the examples described herein pertain to a single process 132 supporting a single game session, it is to be appreciated that, depending on the game (e.g., the size of the game, complexity of the game, the number of clients 112 engaged in a single game session, and/or other factors), a process 132 may handle multiple game sessions (e.g., for "lighter weight" mobile games), and/or perform other tasks besides hosting a game session to help manage game sessions, interact with client devices 114 and/or the game-hosting service 106, manage the instance 126, and/or perform other actions. The process(es) 132 may be binary processes 132, executable processes 132, etc., running on the VM instance 126 that consume or utilize the underlying hardware resources and/or other resources.

To play in a game session, the client devices 114 may interact directly with the game-hosting service 106, and/or through various backend game services to retrieve information on current game sessions, to request new game sessions, and/or reserve slots in game sessions. For instance, the client devices 114 may interact, over one or more networks 120, with game services 138 that may handle communication between client devices 114 and the game-hosting service 106. Further, the game services 138 may handle additional tasks or provide additional services, such as player authentication and authorizations, team building and matchmaking, and inventory control. For example, when a client 112 wants to start a new game, the client device 114 may call the authentication service to first verify the client's 112 identity, and then send a game session request to the game-hosting service 106.

In further examples, the online game of a developer 110 may rely on or utilize one or more additional external services 140, such as for validating a subscription membership and/or determining entitlements for a client's account. As shown, the information from the external services 140 may be passed to the game server(s) 124 via the game services 138 and the game-hosting service 106 without going through the client device(s) 114.

To establish or join a game session, clients 112 may utilize their client devices 114 (e.g., applications, software, or other programs executing thereon) to request (e.g., via an API call) that the game-hosting service 106 place them in a game session. To create a game session, a match is generally formed or made as an initial step, followed by a step of placing the match. In some embodiments, the game services 138 may execute matchmaking logic to match players 112 together in matches. For example, if a player 112 connects to the game services 138 over the network 120 for playing a multiplayer game, the client device 114 of the player 112 may present a screen that lists other online players 112 for selection, and the player 112 can select another player 112 from the list to play against. Other matchmaking factors can be considered as well, or as an alternative, such as skill level (e.g., match players 112 with commensurate skill levels). In some embodiments, the game-hosting service 106 may execute matchmaking logic on behalf of a game developer 110.

After forming a match, the game-hosting service 106 may be tasked with placing the match. It is to be appreciated that, in some embodiments, short of forming a new match, the game-hosting service 106 may identify an already running process 132 that is hosting a game session, and if the active game session has an open player slot(s) that the player(s) 112 associated with the game session request can be placed into, the game-hosting service 106 may assign the player(s) 112 to the open player slot(s) in the active game session, without having to form a separate match. Otherwise, the game-hosting service 106 may have already spun up VM instances 126 in fleets that are allocated for various subscribers of the service provider network 102, and each of the spun up VM instances 126 may have server processes 132 executing thereon in idle mode until the processes 132 are assigned to a game session request for hosting a corresponding game session (associated with a match) until the game session ends. Other than loading maps and other data for hosting a particular game session, these idle processes may be ready to start hosting a game session as soon as they are assigned to a game session request. The game-hosting service 106 may be tasked with identifying a server process 132 executing on a VM instance 126 that is executing on a common server 124, which will serve multiple players 112 in a set (e.g., 2, 10, 100, etc.) of players 112 that have been matched together for playing a multi-player game. Accordingly, for an incoming game session request, the game-hosting service 106 may resolve a fleet alias by calling a routing service, load fleet data to determine a fleet of VM instances 126 associated with the incoming game session request, and query the data store 134 to identify available (e.g., idle) processes 132 that are usable to host a game session corresponding to the incoming game session request. It is to be appreciated that, for efficiency reasons, the game-hosting service 106 may "pack" server processes 132 as tight as possible to avoid overutilization of resources. That is, the game-hosting service 106 may try to minimize the number of processes 132 that are concurrently executing in idle mode in order to have available a sufficient number of processes 132 while also avoiding unnecessary computing resource consumption that could be utilized for other purposes.

A batching interval 136 can be used for assigning processes 132 to game session requests in batches of processes 132. This batching interval 136 may be adjustable over a range of values (e.g., from 0 to $T_{MAX}$, where $T_{MAX}$ represents any suitable value representing a period of time, which may be specified in any suitable unit of time (e.g., milliseconds, seconds, etc.)). The batching interval 136 may be adjustable to any value over (or within) the range of values. In an illustrative example, the range of values over which the batching interval 136 is adjustable may range from 0 seconds to about 5 seconds (e.g., $T_{MAX}=5$ seconds). When the batching interval 136 is set to a non-zero (or positive) value, incoming game session requests that are received during a given batching interval 136 may be queued (e.g., placed in a queue), and, after a lapse of the batching interval 136, the game-hosting service 106 may query 142 the data store 134 that keeps track of executing processes 132 for a set of available processes 132 that are idle, and, therefore, usable to host a game session. The game-hosting service 106 may query 142 the data store 134 for a number of available processes 132 that is greater than or equal to the number of game session requests that have been queued during the previous batching interval 136. In an illustrative example, if the batching interval 136 is set to $T_1$=100 milliseconds, incoming game session requests are queued over a 100-millisecond interval, and, after a lapse of the 100-millisecond interval, a number of game session requests may have been received and queued. Consider an example where 20 game session requests were received during the 100-millisecond interval. After a lapse of the batching interval 136, the game-hosting service 106 may query 142 the data store 134 for a number of available processes 132. The number of available processes 132 can be greater than or equal to the number of game session requests (e.g., by submitting a query 142 for 30 available processes 132 to assign to 20 game session requests). This ensures that there is a sufficient number of processes 132 to assign at least one process 132 to each game session request. Requesting a number of available processes 132 that is strictly greater than the number of game session requests provides a buffer (e.g., extra processes 132), which may be useful in case of a failure to assign one or more of the available processes 132. For example, if a process 132 has already been assigned to another game session request at a time when the process 132 is being assigned to a game session request, the assignment attempt may fail. Assignment attempts can fail for other reasons as well.

After receiving query results that include a number of available processes 132, the game-hosting service 106 may assign at least some (e.g., a subset) of the available processes 132 to the game session requests that were queued over the previous batching interval 136. In the running example, where the query results include 30 available processes 132, the game-hosting service 106 may assign 20 of the 30 available processes 132 to the 20 game session requests. This assignment of processes 132 to game session requests may occur in various ways. In general, the game-hosting service 106 may select one of the game session requests and may traverse a list of the available processes 132 returned in the query results, one-by-one, attempting to assign the first process 132 in the list to the game session request, and if the assignment fails, running down the list, in order, until a process 132 in the list is successfully assigned to the game session request. This assignment process may iterate for each game session request until all game session requests are assigned at least one process 132. The query results may return a list of available processes 132 ordered in any suitable manner. For example, the data store 134 may keep track of the "age" of executing processes 132 and, thus, may order query results based on age (e.g., from the oldest process 132 to the youngest process 132, from the youngest process 132 to the oldest process 132, etc.). In this manner, the game-hosting service 106 may scan the list of available processes 132 with a preference to assign processes 132 based on the age of the processes 132 by traversing the list from top-to-bottom. In some embodiments, available processes 132 in the data store 134 may be filtered on an age-related criterion (e.g., return available processes 132 that were created in the last N days, N being any suitable number) to generate query results that include a filtered set of processes 132 that satisfy the criterion.

The assignment of a process 132 to a game session request may utilize optimistic locking, meaning that a process 132 may not actually be locked when it is first accessed by a transaction (or operation) to assign the process 132 to a given game session request. This is why assignment failures can occur (e.g., if the process 132 has already been locked by another transaction/operation to assign the process 132 to another game session request). When the transactions per second (TPS) to assign processes 132 to game session requests is relatively high (e.g., 50 to 100 game session assignment TPS), contention can arise, and/or increase, in the form of an increased number or percentage of assignment failures caused by processes 132 already having been assigned to another game session request at a time of optimistic locking for a given game session request. Increasing the batching interval 136 can mitigate this contention by potentially increasing the number of game session requests that are associated with a single query 142 to the data store 134, which means that there will not be any contention between assignment operations for at least the set of game session requests that are associated with the single query 142. When contention subsides, the batching interval 136 can be decreased to a lower value to reduce the latency in assigning processes 132 to game session requests. The assignment of a process 132 to a game session request may further involve updating a record for the process 132 in the data store 134 with the new owner of the process 132; namely, updating a process 132 record in the data store 134 with an identifier of the game session request (or a corresponding game session) to which the process 132 has been assigned. In this manner, the process 132 is locked, or made unavailable, and the process 132 cannot thereafter be assigned to another game session request until its associated game session ends.

After assigning a process 132 to a game session request, a corresponding game session is created, and the assigned process 132 executing on a VM instance 126 of the subscriber's fleet may be instructed to host (or support) the created game session for one or more clients 112 of the subscriber 110 that are associated with the game session. The client application(s) running on the client device(s) 114 associated with the game session may receive connection information (e.g., a port of a server 124, an IP address, etc.), and may create a game connection(s) 144 by connecting directly, over the network(s) 120, to the open game server 124 using a player session ID(s). The server process 132 may then accept the player ID(s) as a valid ID(s) and accepts, or rejects, the game connection(s) 144. If connected, the player session is set to active and the client(s) 112 begins playing the game using their client device(s) 114 and the game connection 144 that is established between the game server 124 that has the instance 126 with the process 132 executing to host the selection game session. Once a game session has ended (e.g., clients 112 quit, the game ends, time out, etc.), the client application on each of the involved client devices 114 may disconnect from the process 132, and the game-hosting service 106 can change the game session to terminated, upload a game session log to storage, and update a fleet utilization to indicate that the game server 124 has one less process executing 132.

It is to be appreciated that the game-hosting service 106 may deploy (e.g., via a control plane) a fleet of hosts, and each host of the fleet of hosts may implement its own batching interval 136 independently from the other hosts. The number of hosts in the fleet of hosts is configurable. In some embodiments, the number of hosts in the fleet of hosts may range from about 6 hosts to 30 hosts, depending on various factors. When the game-hosting service 106 receives a game session request, the game session request may be routed to one of the hosts in the fleet of hosts. The host that receives the game session request may implement its own batching interval 136 independently from the other hosts. This "per-host" batching means that, in some cases, a first host (host A) of the fleet of hosts may receive a single game session request (request A) during its own batching interval 136, and a second host (host B) of the fleet of hosts may receive a single game session request (request B) during its own batching interval 136, and the two game session requests (requests A and B) might contend with each other for the same server process 132. In some embodiments, the individual batching intervals 136 utilized by each host of the fleet of hosts may be staggered with respect to each other. For example, an instance of the start time of the batching interval 136 for host A may not occur simultaneously with the start time of the batching interval 136 for host B (e.g., the start times of the respective batching intervals may not be synchronized), and so on for any number of hosts in a fleet of hosts. Staggering the batching intervals 136 in this way can reduce contention, as compared to having multiple batching intervals 136 synchronized with each other.

As mentioned, the game-hosting service 106 may deploy a group of instances 126, often referred to as a "fleet" of instances 126, on game servers 124. In various examples, a fleet of instances 126 may all support the same game build 118, or the same online game. Each instance 126 in a fleet may run multiple processes 132 simultaneously, depending on the hardware capability, and each server process can host at least one game session. Since a game build 118 can have one or multiple executable files, a developer 110 and/or the service provider 104 may configure a fleet to run multiple server processes 132 of each executable on each instance 126. In order to configure a fleet of instances 126 to run one or more processes 132, the developer 110 and/or service provider 104 may generate configuration data 146 that describes what processes 132 run on each instance 126 in a fleet. Each instance 126 in the fleet launches the server processes 132 specified in the configuration data 146 and launches new ones as existing processes 132 end. Each instance 126 may regularly check for updated configuration data 146 and follows the new instructions.

Figure 2:
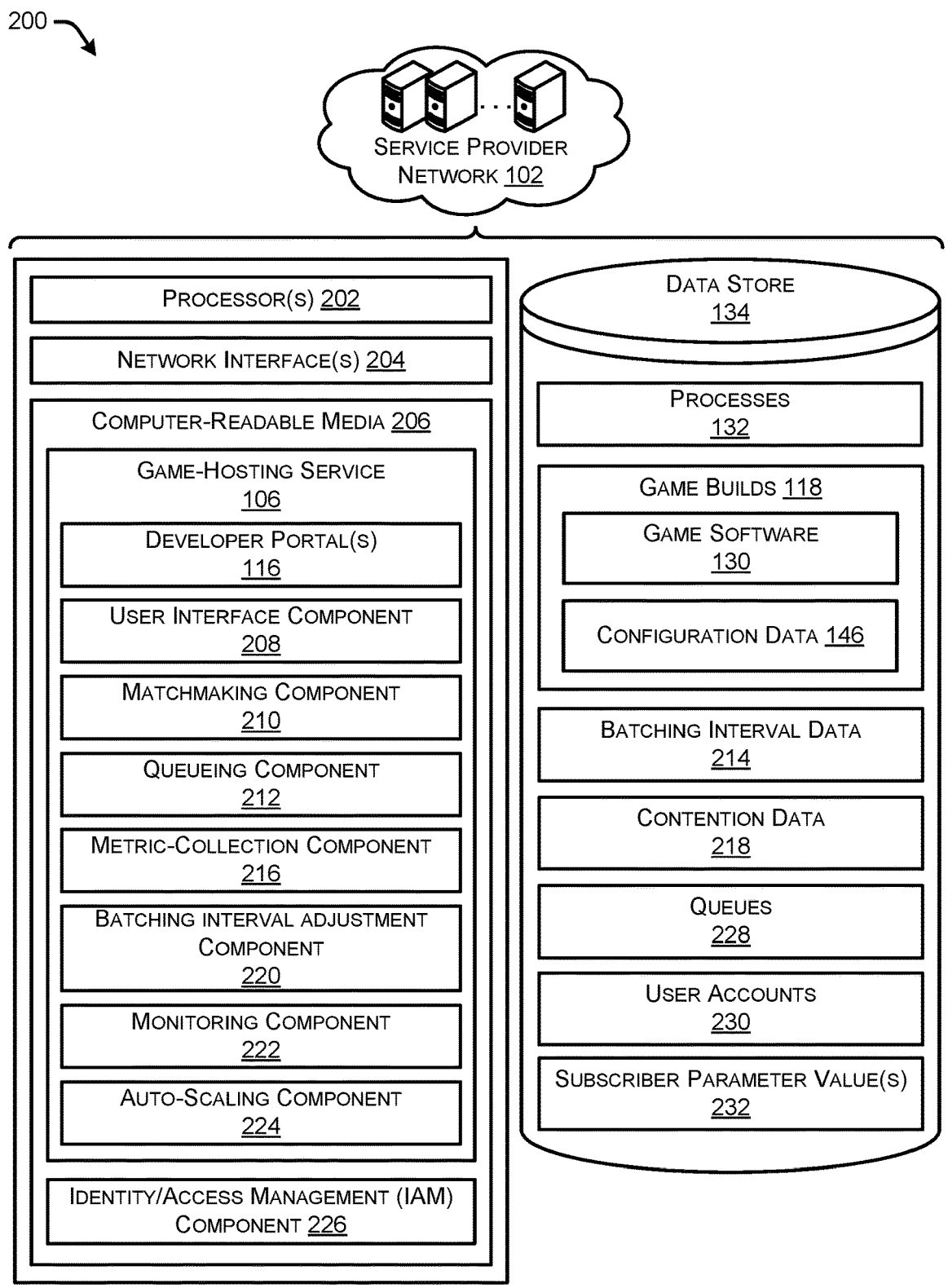
FIG. 2 illustrates a component diagram of an example service provider network that provides a game-hosting service that is configured to dynamically adjust a batching interval used to assign processes to game session requests in batches of processes.

FIG. 2 illustrates a component diagram 200 of an example service provider network 102 that provides a game-hosting service 106 that is configured to dynamically adjust a batching interval 136 used to assign processes 132 to game session requests in batches of processes. As illustrated, the service provider network 102 may include one or more hardware processors 202 (processors) configured to execute one or more stored instructions. The processor(s) 202 may comprise one or more cores. Further, the service provider network 102 may include one or more network interfaces 204 configured to provide communications between the service provider network 102 and other devices, such as the developer device(s) 108 and/or the client device(s) 114. The network interfaces 204 may include devices configured to couple to PANs, wired and wireless LANs, wired and wireless WANs, and so forth. For example, the network interfaces 204 may include devices compatible with Ethernet, Wi-Fi™, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS® SERVER operating system from MICROSOFT Corporation of Redmond, Wash. According to further embodiments, the operating system(s) can comprise the UNIX operating system or one of its variants. It should be appreciated that other operating systems can also be utilized.

The computer-readable media 206 may store portions, or components, of the game-hosting service 106 described herein. For instance, the computer-readable media 206 may store the developer portal(s) 116 through which developer(s) 110 may provide their game builds 118, and/or other input for managing their online games. Additionally, the computer-readable media 206 may store a user interface component 208 configured to provide portals, user interfaces, and/or other avenues through which clients 112 and/or subscribers 110 may interact with information (e.g., account settings) and/or the online games hosted by the game-hosting service 106. In some embodiments, the user interface component 208 may notify clients 112, via a user interface presented on their respective client devices 114, about the possibility that they may experience a short delay to place their match due to the batching of server process 132 assignments.

The computer-readable media 206 may further store a matchmaking component 210 configured to, when executed by the processor(s) 202, provide various matchmaking functionality for the game-hosting service 106. Generally, the matchmaking component 210 may include a customizable rules engine that allows developers 110 to design how to match clients 112 (or players 112) together based on player attributes and game modes that are appropriate for the online game. The matchmaking component 210 may further manage the details for forming player groups for game sessions, and placing the player groups into active or recently created/initiated game sessions. As mentioned, the game services 138 may include its own matchmaking logic. In some embodiments, some matchmaking is performed by the game services 138, while additional matchmaking logic may be executed by the matchmaking component 210 of the service provider network 102 to augment the matchmaking process.

The computer-readable media 206 may further store a queueing component 212 configured to, when executed by the processor(s) 202, manage queues for placing new game sessions with appropriate or available hosting resources (e.g., instances 126) across fleets and/or geographic regions. Generally, the matchmaking component 210 builds on the queueing component 212 because, once a match is created, the matchmaking component 210 may hand or send the match details to a queue that is managed by the queueing component 212. The queueing component 212 may then search for available hosting resources (e.g., available processes 132) in the fleet of instances 126 and start a new game session for the players in the match. As mentioned a batching interval 136 may be utilized to assign server processes 132 to incoming game session requests in batches of processes 132. Therefore, the queueing component 212 may be configured to queue game session requests for the duration of the batching interval 136, and then query the data store 134 between successive batching intervals 136 to identify available processes 132 that can be assigned to the queued game session requests for each batching interval 136. The data store 134 is shown as storing batching interval data 214 which may store the present value (e.g., period of time) to which the batching interval 136 is presently set. That is, the batching interval 136 can be adjusted to any value within a range of values, and the batching interval data 214 may indicate the value that is to be used by the queueing component 212.

The computer-readable media 206 may further store a metric-collection component 216 configured to, when executed by the processor(s) 202, collect contention data 218 and/or other metric values that are utilized to determine how, when, how fast, and/or by how much, to adjust the batching interval 136. The metric-collection component 216 may be configured to periodically, continuously, etc., collect the contention data 218, and provide the contention data 218 to a batching interval adjustment component 220 stored in the computer-readable media 206. The batching interval adjustment component 220 may be configured to, when executed by the processor(s) 202, and based at least in part on the contention data 218, adjust the batching interval 136 (e.g., by updating the batching interval data 214).

In addition to contention data 218, or as an alternative, the metric-collection component 216 may collect throughput data indicative of the number of game session requests received by the game-hosting service 106 per unit time. For example, throughput data may indicate whether the game-hosting service 106 is receiving 10 game session requests per second, 100 game session requests per second, or some other throughput value. The batching interval adjustment component 220 may be configured to, based at least in part on this throughput data, adjust the batching interval 136, such as by increasing the batching interval 136 when throughput is high, and decreasing the batching interval when throughput is low. In an illustrative example, if the game-hosting service 106 is receiving 1,000 game session requests per second, the batching interval 136 may be adjusted to 100 milliseconds, and when the throughput increases to 10,000 game session requests per second, the batching interval 136 may be increased to 250 milliseconds to alleviate contention that is likely to result from the increased throughput.

The computer-readable media 206 may further store a monitoring component 222 that, when executed by the processor(s) 202, collects information for a game session and logs them in a storage location for a developer 110. For instance, the monitoring component 222 may identify and collect metrics for game sessions hosted on an instance 126, such as length of the game sessions, players involved, type of game, events occurring in the game, hardware utilization metrics, players leaving and/or entering the game, and/or various other metadata for a game session that may be of interest to a developer 110.

The computer-readable media 206 may further store an auto-scaling component 224 that, when executed by the processor(s) 202, scales up or down the number of instances 126 available to host game sessions or other processes 132. For example, the auto-scaling component 224 may provide a fast, efficient, and accurate way to match fleet capacity to player usage. In some examples, the auto-scaling component 224 may track the fleet's hosting metrics and determine when to add or remove instances 126 based on a set of guidelines, called policies, that may be defined by the developer 110. The auto-scaling component 224 can adjust capacity in response to changes in player demand to help ensure that the fleet of instances 126 has availability for new players without maintaining an excessive amount of idle resources.

To utilize the services provided by the service provider network 102, clients 112 and developers 110 may register for an account with the service provider network 102. For instance, clients 112 and developers 110 may utilize a device to interact with an identity and access management (IAM) component 226 that allows the clients 112 and developers 110 to create an account with the service provider network 102. Generally, the IAM component 226 may enable the clients 112 and developers 110 to manage access to their cloud-based services and computing resources securely. Using the IAM component 226, the developers 110 may manage their game builds 118 and/or fleets of instances 126 as described herein. Additionally, clients 112 may interact with their account to, for example, change settings for their gaming experience, management payments, and/or other functions.

The data store 134 (e.g., object storage) may represent one or more data stores that stores various data described herein at one or more locations in the service provider network 102. The data store 134 may track processes 132 that are currently executing on VM instances 126 of the service provider network 102. Records for these processes 132 may include additional data/metadata including, without limitation, an owner (e.g., whether the process is idle and available, or assigned to a game session (or game session request) as an owner), identifiers of VM instance 126, fleet, subscriber 110, etc. The data store 134 may further include the game builds 118 for developers 110 that include game software 130 and configuration data 146, which may be updated at any suitable time by the developer 110 or otherwise, along with other data described herein. The data store 134 may further store the batching interval data 214, the contention data 218, queues 228 in which new player groups or game groups (i.e., game session requests) are queued before being placed into instances 126 (e.g., and assigned a process 132 executing thereon), user accounts 230 for the clients 112 and/or developers 110, and subscriber parameter values 232, which, as explained in further detail below, may dictate the batching interval data 214 for a given subscriber 110.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service-provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

Figure 3:
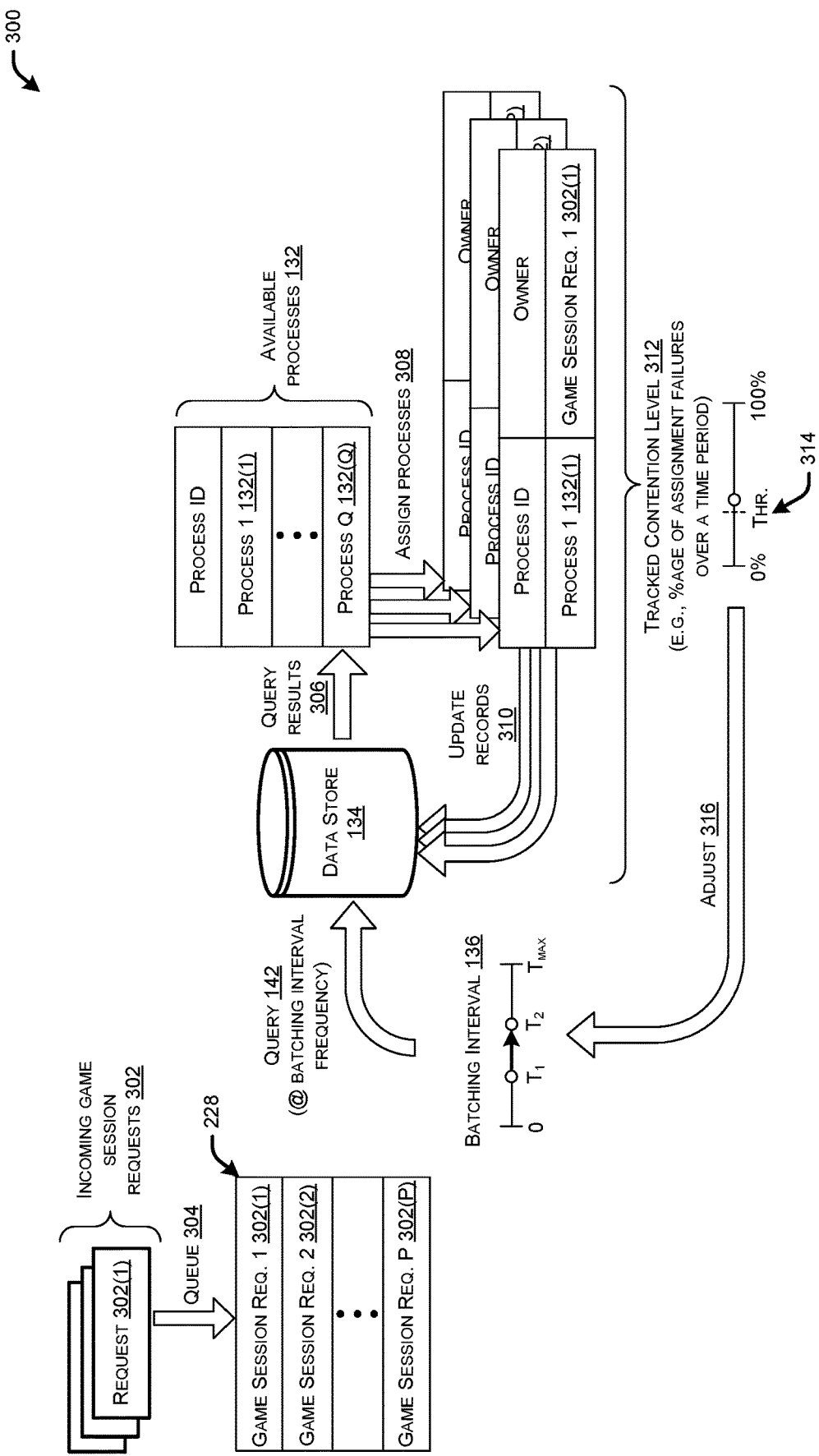
FIG. 3 illustrates a schematic diagram of an example technique, implemented by a game-hosting service, for dynamically adjusting a batching interval based on a level of contention resulting from operations to assign processes to game session requests.

FIG. 3 illustrates a schematic diagram 300 of an example technique, implemented by a game-hosting service 106, for dynamically adjusting a batching interval 136 based on a level of contention resulting from operations to assign processes 132 to game session requests.

Initially, the batching interval 136 may be set to a first value, $T_1$, which may represent a first period of time (e.g., 100 milliseconds). Using this batching interval 136 set to a value of $T_1$, the game-hosting service 106 may cause VM instances 126 to be spun up and to execute associated processes 132, at least some of which execute in idle mode so as to be available to host a new game session. Thus, multiple first server processes 132 may execute on a fleet of VM instances 126. The fleet of instances 126 may be allocated to a particular subscriber 110 of the service provider network 102 and may be running on computing resources of the service provider network 102. As incoming game session requests 302 are received by the game-hosting service 106, the game-hosting service 106 may perform operations to assign the multiple first server processes 132 to the incoming game session requests 302. Specifically, the number, P, of the incoming game session requests 302(1)-(P), P being any number, received during a batching interval 136 set to a value of $T_1$ may be queued 304 in a queue 228 of multiple game session requests 302(1)-(P). After a lapse of the batching interval 136 set to a value of $T_1$, the game-hosting service 106 may query 142 the data store 134 for a number, Q, of the multiple first server processes 132, where Q≥P. Query results 306 returned based on the query 142 may include a set of Q available processes 132 that, according to the data store 134 at the time of the query 142, are available to assign to the game session requests 302(1)-(P).

The game-hosting service 106 may assign 308 at least a subset of the available processes 132 to the multiple game session requests 302(1)-(P), as described herein. For example, the game-hosting service 106 may traverse a list of the available processes 132 (e.g., from top-to-bottom) to assign a process 132 to each game session request 302 in the set of P game session requests 302(1)-(P). The assignment 308 of processes 132 may include updating records 310 for the processes 132(1)-(Q) in the data store 134. As mentioned, the assignment 308 of processes 132 to game session requests 302 may use optimistic locking. As such, upon updating 310 a record for a process 132 to indicate the new owner (e.g., game session request 302), the update may result in a failed attempt to assign the process 132 to the game session request 132. This may be due to the updating 310 of the record being conditional upon the owner in the process record being set to "NULL," indicating that the process 132 has not been locked or otherwise been made unavailable.

Thus, over time (e.g., over several batching intervals 136) these operations are performed to assign processes 132 to game session requests, and the metric-collection component 216 may track contention data 218 as these assignment operations are performed. The contention data 218 may include a number of failed attempts to assign individual processes 132 to game session requests 302. The contention data 218 may also include a number of successful attempt to assign individual processes 132 to game session requests 302. In this manner, the game-hosting service 106 may determine, a level of contention 312 (e.g., "tracked contention level 312" in FIG. 3) resulting from the operations to assign processes 132 to game session requests 302 over a time period. For example, the game-hosting service 106 may look back in the history of the collected contention data 218 to determine, for a given time period (e.g., a time period of one second), a number or a percentage of failed attempts to assign individual processes 132 to a game session request 302, wherein the failed attempts are caused by the individual processes 132 having already been assigned to a game session request 302. Thus, in FIG. 3, the level of contention 312 is indicated as a value within a range of 0% to 100%, meaning a range of 0% assignment failures to 100% assignment failures. If there are no assignment failures, meaning there is not a single instance, over the time period, where an attempt to assign a process 132 to a game session request 302 failed, the contention level 312 is determined as 0%, or non-existent. On the other hand, if every assignment attempt, over the time period, resulted in a failure to assign a process 132 to a game session request 302, the contention level 312 is determined as 100%. In practice, the contention level 312 may, at times, be non-existent (e.g., 0%), or, when throughput of game session requests 302 increases, the contention level 312 may trend upwards, but may not reach 100%. FIG. 3 illustrates an example where the contention level 312 might be roughly 40% (e.g., 40% of all assignment attempts over the time period were failed attempts to assign processes 132 to game session requests 302, caused by those processes 132 having already been assigned to another game session request 302).

It is to be appreciated that "smoothing" may be utilized in tracking contention. That is, the game-hosting service may determine the level of contention 312 as a number or percentage of failed assignment attempts over a time period that is of a relatively long duration, which may avoid reacting to short spikes of contention that could be tolerated for a very short period of time without increasing the batching interval 136.

In some embodiments, a threshold 314 (or threshold level of contention 314) may be utilized to determine when to adjust 316 the batching interval 136. For example, as long as the level of contention 312 remains below the threshold 314, the batching interval 136 may not be adjusted. In other words, some amount of contention may be tolerable, according to some embodiments. However, if and when the game-hosting service 106 determines that the level of contention 312 (e.g., the number or the percentage of failed assignment attempts) is greater than or equal to the threshold 314, the batching interval adjustment component 220 may adjust 316 the batching interval 136 by increasing the batching interval 136 from a first value (e.g., $T_1$, representing a first period of time) to a second value (e.g., $T_2$, representing a second period of time greater than the first period of time, $T_1$). For example, $T_2$ may represent a period of time equal to 200 milliseconds. By increasing the batching interval 136 in this manner, the contention resulting from the assignment operations in the future may be mitigated, and the contention level 312 may decrease, as a result. Thus, the contention level 312 can be monitored, and, as soon as the contention level 312 falls back below the threshold 314, the batching interval adjustment component 220, may cease to increase the batching interval 136 any further. If the batching interval 136 is increased to a highest value (e.g., $T_{MAX}$) of the range of values over which the batching interval 136 is adjustable, this may be another condition for ceasing to increase the batching interval 136 any further.

It is to be appreciated that the batching interval data 214 may, in addition to specifying the value of the batching interval 136, specify other values, such as a rate at which the batching interval 136 is to be increased when adjusted 316, a rate at which the batching interval 136 is to be decreased when adjusted 316 (where the rate of increase may be the same as, or different than, the rate of decrease), the threshold 314 (i.e., threshold level of contention) used to trigger an adjustment 316 of the batching interval 136, and/or the range of values over which the batching interval 136 is adjustable. This data 214 can be configured appropriate to control when, how fast, by how much, and/or the extent to which the batching interval 136 is adjusted based on the contention level 312. In some embodiments, when the rate at which the batching interval 136 is to be increased or decreased may be specified as an incremental amount of change per adjustment of the batching interval 136. For example, the rate at which the batching interval 136 is increased may be specified as "increase the batching interval 136 in increments of 100 milliseconds." Accordingly, so long as the contention level 312 is greater than or equal to the threshold 314, the batching interval 136 may be adjusted (or floated) upward in increments of 100 milliseconds, where an adjustment is made each time the contention level 312 is re-calculated and determined to be greater than or equal to the threshold 314. This may be a similar process in the opposite direction, but the adjustment increments may be different, or the same, in the downward direction. For example, if the contention level 312 is less than the threshold 314, the batching interval may be adjusted (or floated) downward in increments of, say, 200 milliseconds, towards a minimum value (e.g., 0 milliseconds). A more gradual rate of adjustment of the batching interval 136 in either direction may mitigate a "bouncing around" effect that may occur if the adjustment to the batching interval 136 is faster or made in larger increments. On the other hand, a faster adjustment, and/or adjustment in larger increments, may have the effect of mitigating contention quicker. Thus, a balanced approach may be taken such that the rate of adjustment, and/or the amount of each adjustment may be at a value that is likely to mitigate contention, but unlikely to settle at a drastically different value.

In some embodiments, the batching interval adjustment component 220 may determine a target value for the batching interval 136 based at least in part on the level of contention 312. For example, if the contention level 312 is relatively high, the relatively high target value may be determined, and the batching interval 136 may be adjusted immediately, or incrementally, towards the target value. By contrast, if the level of contention 312 is relatively low, a correspondingly lower target value may be determined, and the batching interval 136 may be adjusted immediately, or incrementally, towards the target value. This may be based on the notion that a relatively shorter batching interval 136 may be sufficient to mitigate a low-to-moderate level of contention 312. The determination of a target value may be based on heuristics, machine learning algorithms, or the like. An example objective may be to keep the batching interval 136 as short as possible while still keeping the contention level 312 at an acceptable level (e.g., below the threshold 314).

Figure 4:
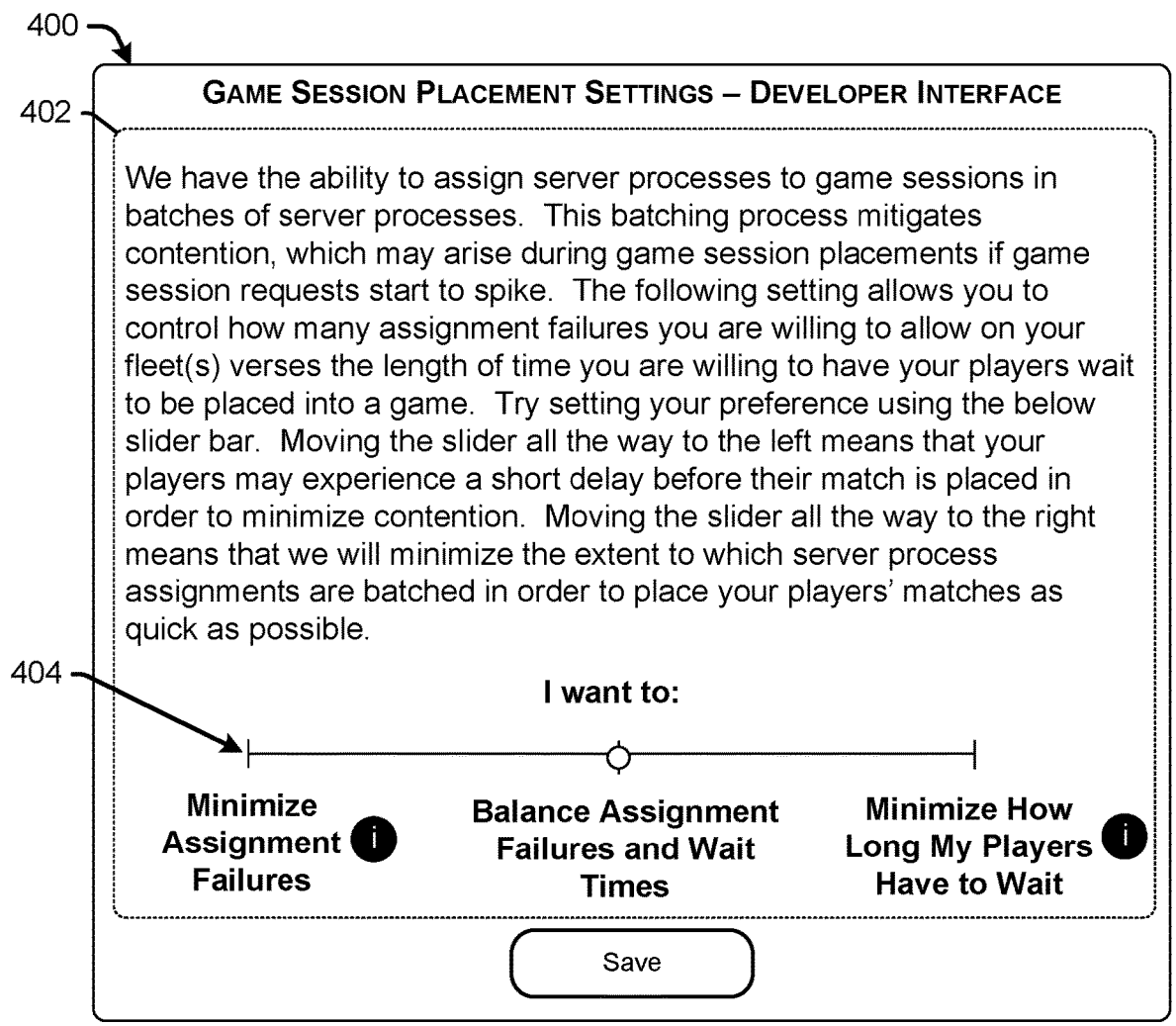
FIG. 4 illustrates an example graphical user interface by which a game developer can adjust a parameter that controls an aspect of assigning processes to game session requests in batches of processes.

FIG. 4 illustrates an example graphical user interfaces 400 by which a game developer 110 can adjust a parameter that controls an aspect of assigning processes 132 to game session requests 302 in batches of processes 132. The developer 110 may have created a developer profile or account 230 with the service provider network 102 and may access the user interface 400 via a developer portal 116.

The developer user interface 400 may include a message portion 402 that explains that a batching approach is being taken to assign server processes 132 to game session requests 302 in batches of server processes 132. The message portion 402 may further explain a parameter that is adjustable via a control element 404 (e.g., a slider bar) to control an aspect of assigning processes 132 to game session requests 302 in batches of processes 132. In the example user interface 400 FIG. 4, the developer 110 may adjust a parameter by manipulating the control element 404, such as by moving a slider between leftmost end and a rightmost end of the control element 404 in the form of a slider bar. For instance, if the developer 110 manipulates the control element 404 by moving the slider all the way to the leftmost end of the slider bar, that means that the developer 110 is agreeing to have the game-hosting service 106 utilize a suitable batching interval 136 to try and maintain the contention level 312 at as low a level as possible (e.g., roughly 0% assignment failures). That is, if the developer 110 does not want to have any contention on its fleet(s) of VM instances 126 during game session placement, the batching interval 136 may be increased, as needed, to alleviate contention and bring the level of contention 312 as close to zero as possible. This may mean that the developer's 110 clients 112 may experience a short delay before their match is placed. On the other hand, if the developer 110 would like to minimize the use of the batching approach, the developer 110 can manipulate the control element 404 by moving the slider all the way to the rightmost end of the slider bar, which means that the system may minimize its utilization of the batching interval 136, such as by keeping the batching interval 136 at a value of zero (0) seconds, and increasing the batching interval 136 by as little of an amount possible, and as seldom as possible. When the developer 110 manipulates the control element 404, the user interface component 208 may update a subscriber parameter value 232, and the user interface component 208 may configure the batching interval data 214 based on the updated subscriber parameter value 232. For example, the user interface component 208 may set a value corresponding to a first rate at which the batching interval 136 is increased based on an increased level of contention 312. The user interface component 208 may additionally, or alternatively, set a value corresponding to a second rate at which the batching interval 136 is decreased based on a decreased level of contention 312. The user interface component 208 may additionally, or alternatively, set a value corresponding to the threshold 314 (e.g., threshold level of contention 314) that triggers adjustment of the batching interval 136. The user interface component 208 may additionally, or alternatively, set upper and lower values corresponding to a range over which the batching interval 136 is adjustable.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
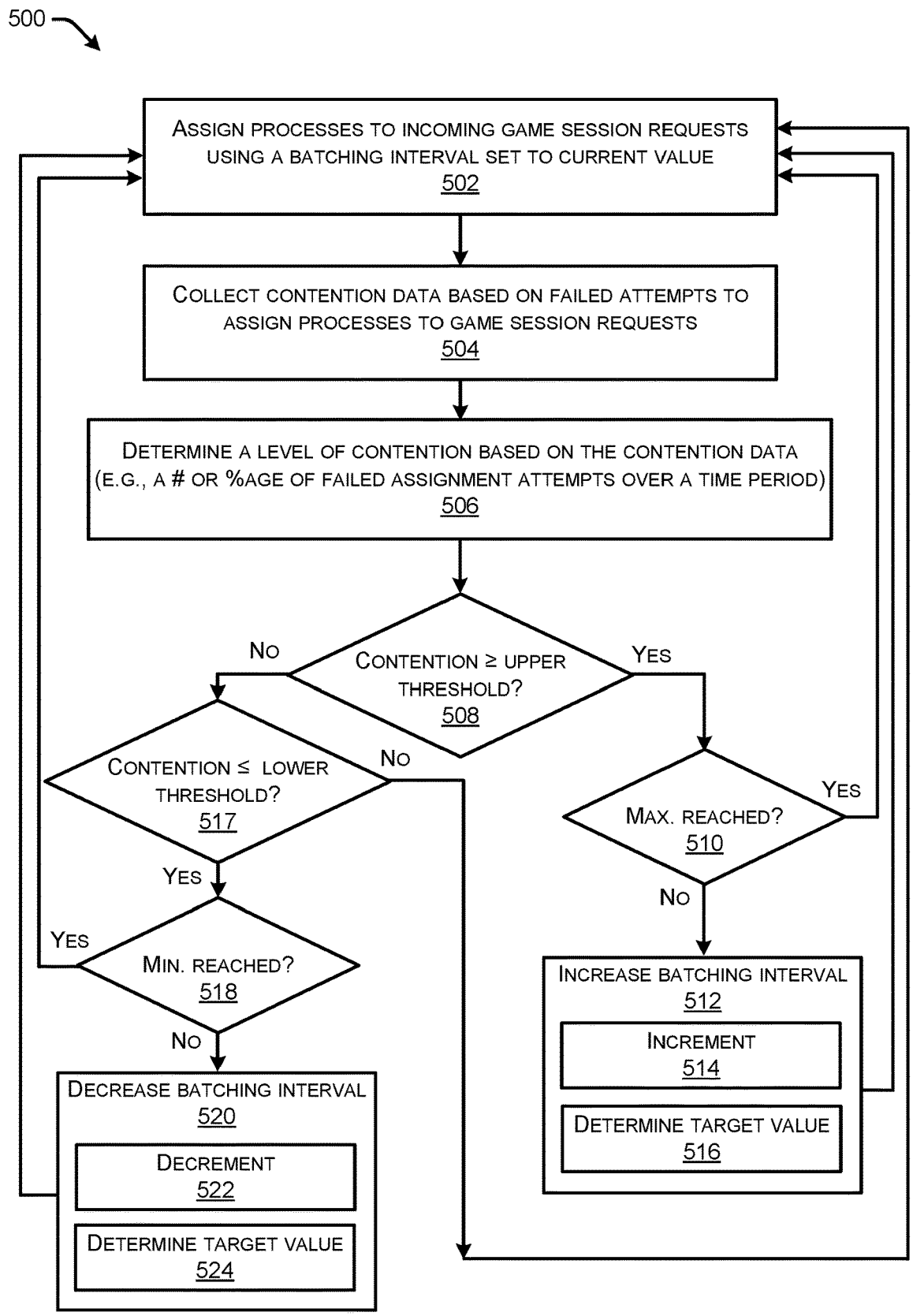
FIG. 5 illustrates a flow diagram of an example process for dynamically adjusting a batching interval based on a level of contention resulting from operations to assign processes to game session requests.

FIG. 5 illustrates a flow diagram of an example process 500 for dynamically adjusting a batching interval 136 based on a level of contention 312 resulting from operations to assign processes 132 to game session requests 302. For discussion purposes, the process 500 is described with reference to the previous figures.

At 502, a game-hosting service 106 (or a component thereof) may perform operations to assign processes 132 to game session requests 302 using a batching interval 136 set to a current value. It is to be appreciated that these processes 132 may be executing (e.g., in idle mode) on a fleet of VM instances 126 at a time of the assigning at block 502. This fleet of VM instances 126 may be allocated to a subscriber 110 of a service provider network 102, and the VM instances 126, and the processes 132 executing thereon, may be running on computing resources of the service provider network 102. The assigning of processes 132 to game session requests 302 at block 502 may involve queuing incoming game session requests 302 received during the batching interval 136, and, after a lapse of the batching interval 136, querying a data store 134 for a number of available processes 132 to assign to the queued game session requests 302. Once assigned, these processes 132 may be executed on corresponding servers 124 to host corresponding game sessions.

At 504, the metric-collection component 216 of the game-hosting service 106 may collect contention data 218 based at least in part on the assignment operations performed at block 502. The contention data 218 may include a number (or count) of failed attempts to assign individual processes 132 to game session requests 302. The contention data 218 may also include a number (or count) of successful attempt to assign individual processes 132 to game session requests 302. The collection of contention data 218 at block 504 may occur periodically, continuously, or upon the occurrence of an event(s) (e.g., at the lapse of each batching interval 136).

At 506, the game-hosting service 106 (or a component thereof) may determining a level of contention 312 resulting from the operations to assign processes 132 to game session requests 302. In other words, the level of contention 312 may be determined based at least in part on the contention data 218 collected at block 504. For example, the game-hosting service 106 may look back in the history of the collected contention data 218 to determine (or detect), for a given time period (e.g., a time period of one second, one minute, etc.), a number of failed attempts to assign individual processes 132 to a game session request 302, wherein the failed attempts are caused by the individual processes 132 having already been assigned to a game session request 302, and wherein the failed attempts are indicative of contention resulting from the assignment operations performed at block 502. As another example, the game-hosting service 106 may determine (or detect), for a given time period, a percentage of total attempts to assign individual processes 132 to game session requests 302 that correspond to failed attempts.

At 508, the game-hosting service 106 (or a component thereof) may determine whether the level of contention 312 determined at block 506 violates a first (e.g., upper) threshold level of contention 314. For example, the first (e.g., upper) threshold 314 may be violated at block 508 if the level of contention 312 is greater than or equal to the first threshold level of contention 314 (e.g., the number or the percentage of the failed attempts is greater than or equal to the first threshold 314). As another example, the first (e.g., upper) threshold 314 may be violated at block 508 if the level of contention 312 is greater (e.g., strictly greater than) than the first threshold level of contention 314 (e.g., the number or the percentage of the failed attempts is greater than or equal to the first threshold 314). Based on the first (e.g., upper) threshold 314 being violated at block 508, the process 500 may follow the "YES" route from block 508 to block 510.

At 510, the game-hosting service 106 (or a component thereof) may determine whether a maximum (or highest) value of a range of values over which the batching interval 136 is adjustable has been reached. For example, on a previous iteration of the process 500, the batching interval 136 may have been increased to a maximum value (e.g., $T_{MAX}$, representing a period of time that is the highest value in the range). In this case, the process 500 may follow the "YES" route from block 510 back to block 502, without increasing the batching interval 136. That is, based at least in part on the batching interval 136 being set to a highest value in a range of possible values, the batching interval adjustment component 220 may cease to increase, or otherwise refrain from increasing, the batching interval 136. If, at 510, the maximum (or highest) value of the range of possible values for the batching interval 136 has not been reached, the process 500 may follow the "NO" route from block 510 to block 512.

At 512, the batching interval adjustment component 220 may adjust, based at least in part on the level of contention 312, the batching interval 136 from a first period of time (a first value) to a second period of time (a second value). Specifically, at block 512, the adjustment may include increasing the batching interval 136 to a new value that is greater than the existing value.

At sub-block 514, the increasing at block 512 may include incrementing the batching interval 136. For example, if an increase from a first period of time (a first value) to a second period of time (a second value) is to occur over multiple iterations of the process 500, the batching interval 512 may be incremented from a first period of time (a first value) to an intermediate period of time (an intermediate value) greater than the first period of time, and then to a second period of time (a second value) greater than the intermediate period of time. The amount by which the batching interval 136 is incremented at block 514 may be determined based at least in part on the level of contention 312 determined at block 506 and/or the amount by which the level of contention 312 exceeds the first (e.g., upper) threshold 314 at block 508. For example, if the level of contention 312 is relatively high, and/or the first (e.g., upper) threshold 314 is exceeded by a relatively high amount, the amount by which the batching interval 136 is incremented may be a relatively large increment, as compared to relatively lower levels of contention and/or a first (e.g., upper) threshold 314 that is exceeded by a small amount.

At sub-block 516, the increasing at block 512 may include determining a target value to which the batching interval 136 is to be increased. The target value to which the batching interval 136 is to be increased at block 516 may be determined based at least in part on the level of contention 312 determined at block 506 and/or the amount by which the level of contention 312 exceeds the first (e.g., upper) threshold 314 at block 508. For example, if the level of contention 312 is relatively high, and/or the first (e.g., upper) threshold 314 is exceeded by a relatively high amount, a relatively higher target value may be determined at sub-block 516 in order to alleviate contention quicker, as compared to relatively lower levels of contention and/or a first (e.g., upper)

threshold 314 that is exceeded by a small amount. Furthermore, the batching interval 136 may be incremented towards the target value at sub-block 514 such that the target value is reached over multiple iterations of the process 500.

It can be appreciated that, by iterating the process 500, the batching interval 136 can be increased (e.g., incremented), and, on each iteration of block 508, a determination can be made as to whether the level of contention 312 no longer violates (e.g., has fallen below) the first (e.g., upper) threshold 314. As soon as the level of contention 312 is determined to be no longer violating the first (e.g., upper) threshold 314, the batching interval adjustment component 220 may cease to increase the batching interval 136.

Returning to with reference to block 508, the determination at block 508 may be, on an initial iteration or any subsequent iteration of the process 500, that the level of contention 312 does not violate the first (e.g., upper) threshold level of contention 314 (e.g., the number or the percentage of the failed attempts is less than the first (e.g., upper) threshold 314). For example, the first (e.g., upper) threshold 314 may not be violated at block 508 if the level of contention 312 is less than or equal to the first threshold level of contention 314 (e.g., the number or the percentage of the failed attempts is greater than or equal to the first threshold 314). As another example, the first (e.g., upper) threshold 314 may not be violated at block 508 if the level of contention 312 is less than (e.g., strictly less than) the first threshold level of contention 314 (e.g., the number or the percentage of the failed attempts is greater than or equal to the first threshold 314). Based on the first (e.g., upper) threshold 314 not being violated at block 508, the process 500 may follow the "NO" route from block 508 to block 518.

At 517, the game-hosting service 106 (or a component thereof) may determine whether the level of contention 312 determined at block 506 violates a second (e.g., lower) threshold level of contention. For example, the second (e.g., lower) threshold may not be violated at block 517 if the level of contention 312 is greater than or equal to the second threshold level of contention (e.g., the number or the percentage of the failed attempts is greater than the second threshold). As another example, the second (e.g., lower) threshold may not be violated at block 517 if the level of contention 312 is greater than (e.g., strictly greater than) the second threshold level of contention (e.g., the number or the percentage of the failed attempts is greater than the second threshold). Based on the level of contention 312 not violating the second (e.g., lower) threshold at block 517, the process 500 may follow the "NO" route from block 517 back to block 502, where the process 500 can iterate. Thus, if the level of contention 312 does not violate either of the first (e.g., upper) or the second (e.g., lower) thresholds, no adjustment to the batching interval 136 is made.

The determination at block 517 may be, on an initial iteration or any subsequent iteration of the process 500, that the level of contention 312 violates the second (e.g., lower) threshold level of contention (e.g., the number or the percentage of the failed attempts is less than or equal to the second (e.g., lower) threshold). For example, the second (e.g., lower) threshold may be violated at block 517 if the level of contention 312 is less than or equal to the second threshold level of contention (e.g., the number or the percentage of the failed attempts is greater than the second threshold). As another example, the second (e.g., lower) threshold may be violated at block 517 if the level of contention 312 is less than (e.g., strictly less than) the second threshold level of contention (e.g., the number or the percentage of the failed attempts is greater than the second threshold). Based on the second (e.g., lower) threshold being violated at block 517, the process 500 may follow the "YES" route from block 517 to block 518.

At 518, the game-hosting service 106 (or a component thereof) may determine whether a minimum (or lowest) value of a range of values over which the batching interval 136 is adjustable has been reached. For example, at startup, or on a previous iteration of the process 500, the batching interval 136 may have been set to, or decreased to, a minimum value (e.g., 0, representing a period of zero seconds, which may be the lowest value in the range). In this case, the process 500 may follow the "YES" route from block 518 back to block 502, without decreasing the batching interval 136. That is, based at least in part on the batching interval 136 being set to a lowest value in a range of possible values, the batching interval adjustment component 220 may cease to decrease, or otherwise refrain from decreasing, the batching interval 136. If, at 518, the minimum (or lowest) value of the range of possible values for the batching interval 136 has not been reached, the process 500 may follow the "NO" route from block 518 to block 520.

At 520, the batching interval adjustment component 220 may adjust, based at least in part on the level of contention 312, the batching interval 136 from a first period of time (a first value) to a second period of time (a second value). Specifically, at block 520, the adjustment may include decreasing the batching interval 136 to a new value that is less than the existing value.

At sub-block 522, the decreasing at block 520 may include decrementing the batching interval 136. For example, if a decrease from a first period of time (a first value) to a second period of time (a second value) is to occur over multiple iterations of the process 500, the batching interval 512 may be decremented from a first period of time (a first value) to an intermediate period of time (an intermediate value) less than the first period of time, and then to a second period of time (a second value) less than the intermediate period of time. The amount by which the batching interval 136 is decremented at block 522 may be determined based at least in part on the level of contention 312 determined at block 506 and/or the amount by which the level of contention 312 is less than the second (e.g., lower) threshold at block 517. For example, if the level of contention 312 is relatively low, and/or the level of contention 312 is relatively far below the second (e.g., lower) threshold, the amount by which the batching interval 136 is decremented may be a relatively large decrement, as compared to relatively higher levels of contention and/or a level of contention 312 that is less than a second (e.g., lower) threshold by a small amount.

At sub-block 524, the decreasing at block 520 may include determining a target value to which the batching interval 136 is to be decreased. The target value to which the batching interval 136 is to be decreased at block 524 may be determined based at least in part on the level of contention 312 determined at block 506 and/or the amount by which the level of contention 312 is less than the second (e.g., lower) threshold at block 517. For example, if the level of contention 312 is relatively low, and/or the level of contention 312 is relatively far below the second (e.g., lower) threshold, a relatively lower target value may be determined at sub-block 524 in order to minimize latency during game session placement quicker, as compared to relatively higher levels of contention and/or a level of contention 312 that is less than a second (e.g., lower) threshold by a small amount. Furthermore, the batching interval 136 may be decremented towards the target value at sub-block 524 such that the target value is reached over multiple iterations of the process 500.

Accordingly, it can be appreciated that the process 500 may iterate to adjust (e.g., increase or decrease) the batching interval 136 based at least in part on a level of contention 312 resulting from assignment operations that are performed to assign processes 132 to game session requests 302. Furthermore, the batching interval 136 may be adjusted incrementally over a time period by iterating the process 500.

Figure 6:
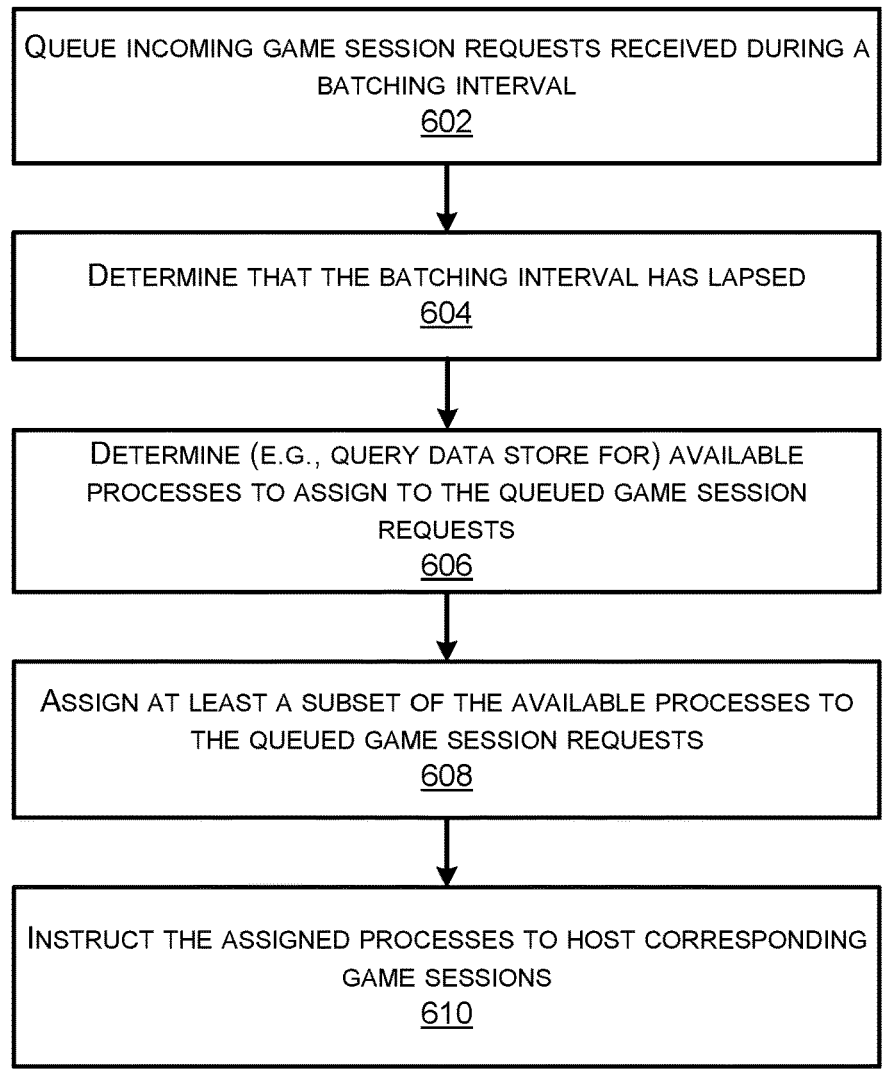
FIG. 6 illustrates a flow diagram of an example process for assigning processes to game session requests using an adjustable batching interval.

FIG. 6 illustrates a flow diagram of an example process 600 for assigning processes 132 to game session requests 302 using an adjustable batching interval 136. For discussion purposes, the process 600 is described with reference to the previous figures.

At 602, a queuing component 212 of the game-hosting service 106 may queue multiple game session requests 302 received during the batching interval 136. These multiple game session requests may, for example, include at least a first game session request 302(1) and a second game session request 302(2), and perhaps additional game session requests 302, depending on the throughput of game session requests at the given moment. The batching interval 136 may be set to any suitable value, for example, by using the process 500, or as otherwise described herein.

At 604, the queueing component 212 may determine that the batching interval 136 has lapsed. This means that it is time for the queuing component 212 to identify available server processes 132 that can be assigned in batch to the set of game session requests 302 queued during the batching interval 136 at block 602.

At 606, after a lapse of the batching interval 136, the queuing component 212 may determine (e.g., by querying a data store 134 for) a number, Q, of available processes 132 that is greater than or equal to a number, P, of the multiple game session requests that were queued during the batching interval 136 at block 602.

At 608, the game-hosting service 106 (or a component thereof) may assign, from the available processes 132, at least a subset of the available processes 132 to the multiple game session requests 302. For example, a first process 132(1) may be assigned to the first game session request 302(1) and a second process 132(2) may be assigned to the second game session request 302(2).

At 610, the assigned processes 132 may be instructed to host corresponding game sessions for the multiple game session requests 302. For example, the first process 132(1) may be instructed to host (or support) a first game session corresponding to the first game session request 302(1), and the second process 132(2) may be instructed to host (or support) a second game session corresponding to the second game session request 302(2). Although contention can arise during the process 600, the adjustability of the batching interval 136 (e.g., using the process 500 of FIG. 5, or otherwise described herein), allows for increasing the batching interval 136, as needed to mitigate contention, while decreasing the batching interval 136 at times when contention has subsided. In this manner, a game-hosting service 106 implementing the process 600 with a dynamically varying batching interval 136 may queue game session requests at block 602 for a longer batching interval 136 on one iteration, while queueing game session requests at block 602 for a shorter batching interval 136 on a subsequent iteration, or vice versa.

Figure 7:
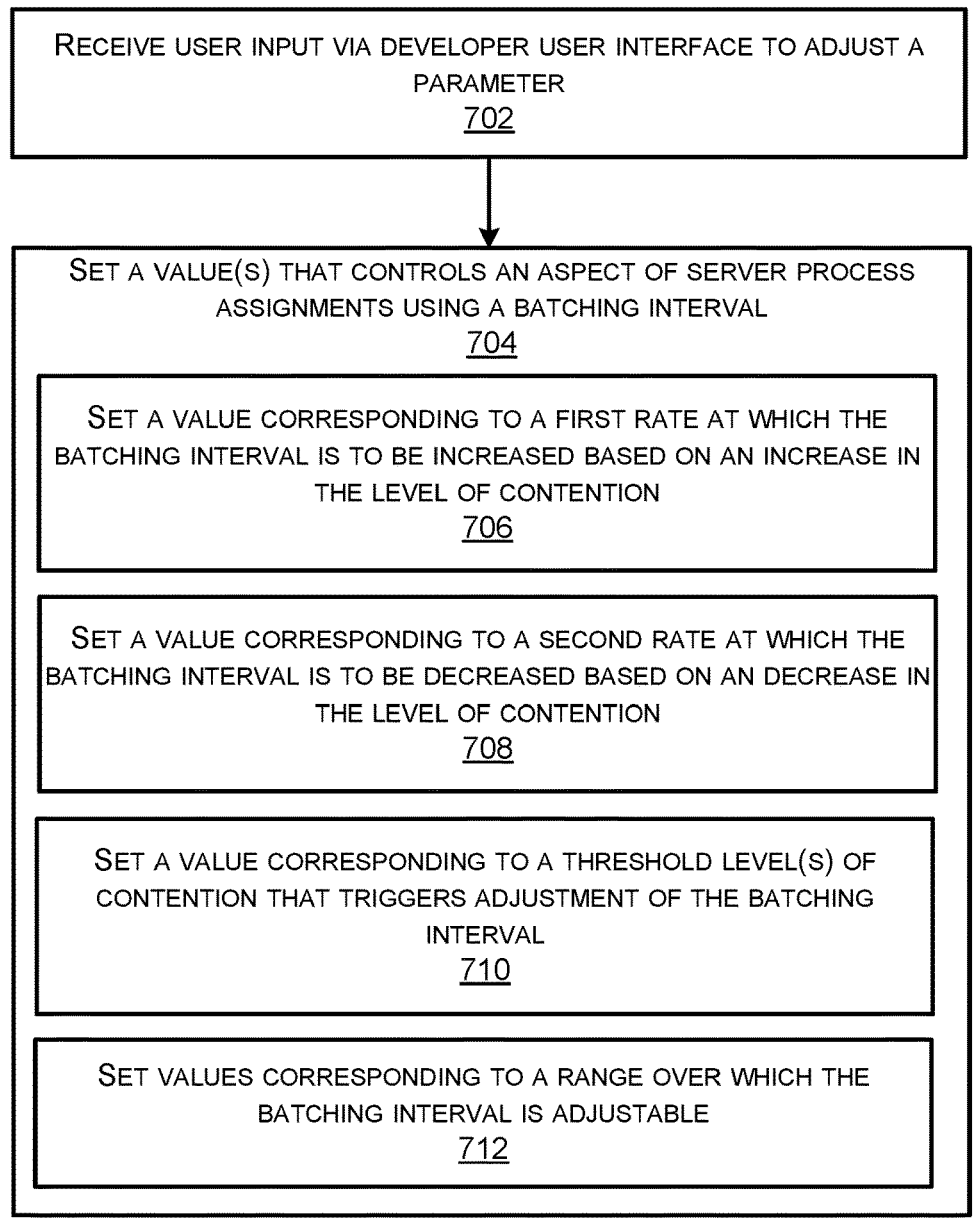
FIG. 7 a flow diagram of an example process for controlling an aspect of assigning processes to game session requests based on a selected parameter value received via a developer user interface.

FIG. 7 a flow diagram of an example process 700 for controlling an aspect of assigning processes 132 to game session requests 302 based on a selected parameter value 404 received via a developer user interface 400.

At 702, a user interface component 208 of a game-hosting service 106 may receive, via a user interface 400 presented on a computing device 108 of the subscriber 110 to a service provider network 102, user input to adjust a parameter to a value (e.g., a subscriber parameter value 232). This parameter value 232, as described with reference to FIG. 4, may comprise a parameter value 404 indicative of a level of contention allowed during game session placements, or a parameter value 404 indicative of an amount of delay allowed during the game session placements. The user input may be received as a manipulation of the control element 404 (e.g., a slider bar) shown in FIG. 4. In other words, a developer 110 (or subscriber 110) may dictate, through the adjustment of control element 404 exposed via a user interface 400, whether and/or how much, they would like server process 132 assignments to be assigned in batch to game session requests 302 for their clients 112. A given subscriber 110 may prefer little-to-no contention (e.g., higher throughput) during game session placement at the possible cost of some observable latency when clients 112 of the subscriber 110 are waiting for their match to be placed and the game session to start. Another subscriber 110 may prefer little-to-no latency during game session placement at the possible cost of some game session requests that timeout, if and when contention rises to a level that causes requests to timeout. Another subscriber 110 may prefer a balance between the two extremes.

At 704, the user interface component 208 of the game-hosting service 106 may set, based at least in part on the value of the parameter 232, one or more values that control an aspect of the server process 132 assignments using a batching interval 136. For example, one or more values can be set (or changed) in the batching interval data 214 stored in the data store 134 based at least in part on the selected parameter value 404.

At sub-block 706, for example, a value may be set that corresponds to a first rate at which the batching interval 136 is, or is to be, increased based on an increase in a level of contention 312. That is, the rate at which the batching interval 136 is to be increased may be set to a relatively faster rate or a relatively slower rate, depending on the selected parameter value 404.

At sub-block 708, for example, a value may be set that corresponds to a second rate at which the batching interval 136 is, or is to be, decreased based on a decrease in a level of contention 312. That is, the rate at which the batching interval 136 is to be decreased may be set to a relatively faster rate or a relatively slower rate, depending on the selected parameter value 404.

At sub-block 710, for example, a value(s) may be set that corresponds to a threshold level(s) of contention, such as the first (e.g., upper) threshold 314 and/or the second (e.g., lower) threshold, that triggers adjustment of the batching interval 136. That is, the threshold(s) used to trigger adjustment of the batching interval 136 may be set to a relatively higher threshold(s) or a relatively lower threshold(s), depending on the selected parameter value 404.

At sub-block 712, for example, upper and/or lower values may be set that correspond to, or define, a range over which the batching interval 136 is adjustable. That is, the upper value that represents a maximum (or highest) value the batching interval 136 may be adjusted to can be set to a relatively higher value or a relatively lower value, depending on the selected parameter value 404.

Figure 8:
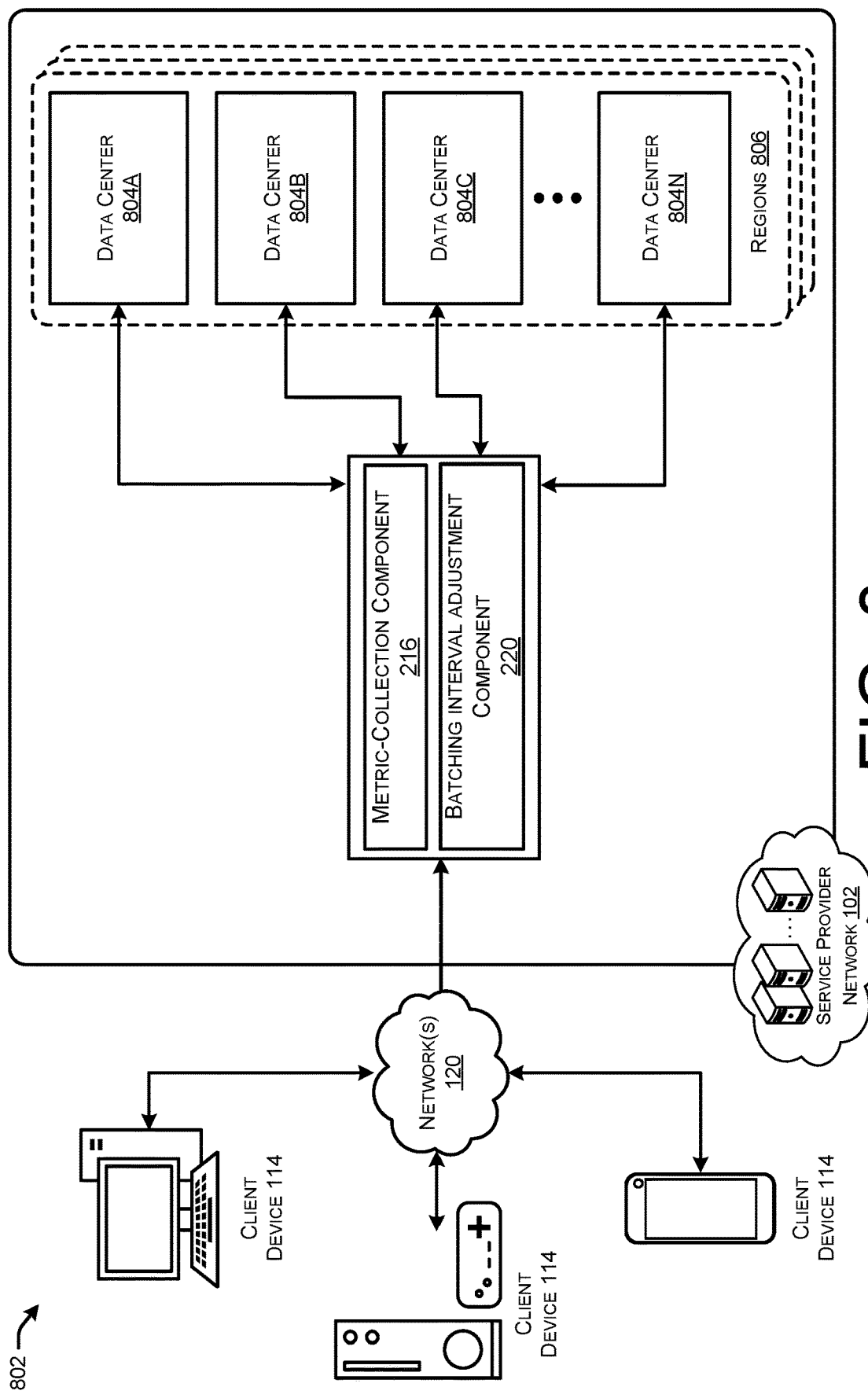
FIG. 8 is a system and network diagram that shows an illustrative operating environment that includes a service provider network that can be configured to implement aspects of the functionality described herein.

FIG. 8 is a system and network diagram that shows an illustrative operating environment that includes a service provider network 102 that can be configured to implement aspects of the functionality described herein. The service provider network 102 can provide computing resources, like VM instances and storage, on a permanent or an as-needed basis. Among other types of functionality, the computing resources 122 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 804A-804N (which might be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations, or regions 806. One illustrative embodiment for a data center 804 that can be utilized to implement the technologies disclosed herein will be described below with regard to FIG. 9.

The clients 110 and developers 110 that utilize the service provider network 102 may access the computing resources provided by the service provider network 102 over any wired and/or wireless network(s) 120, which can be a wide area communication network ("WAN"), such as the Internet, an intranet or an Internet service provider ("ISP") network or a combination of such networks. For example, and without limitation, a client device 114 operated by a client 112 of the service provider network 102 may be utilized to access the service provider network 102 by way of the network(s) 120. It should be appreciated that a local-area network ("LAN"), the Internet, or any other networking topology known in the art that connects the data centers 804 to remote clients and other users can be utilized. It should also be appreciated that combinations of such networks can also be utilized.

As illustrated, as game session requests 302 associated with clients 112 are received, a metric-collection component 216 may collect contention data 218 and/or other metric values that are utilized to determine how, when, how fast, and/or by how much, to adjust the batching interval 136 that is utilized for assigning processes 132 to game session requests 302. The metric-collection component 216 may be configured to periodically, continuously, etc., collect the contention data 218 and provide the contention data 218 to a batching interval adjustment component 220. The batching interval adjustment component 220 may be configured to, based at least in part on the contention data 218, adjust the batching interval 136 (e.g., by updating batching interval data 214) so that the assignment of processes 132 to game session requests 302 occurs at the updated/adjusted batching interval 136.

Figure 9:
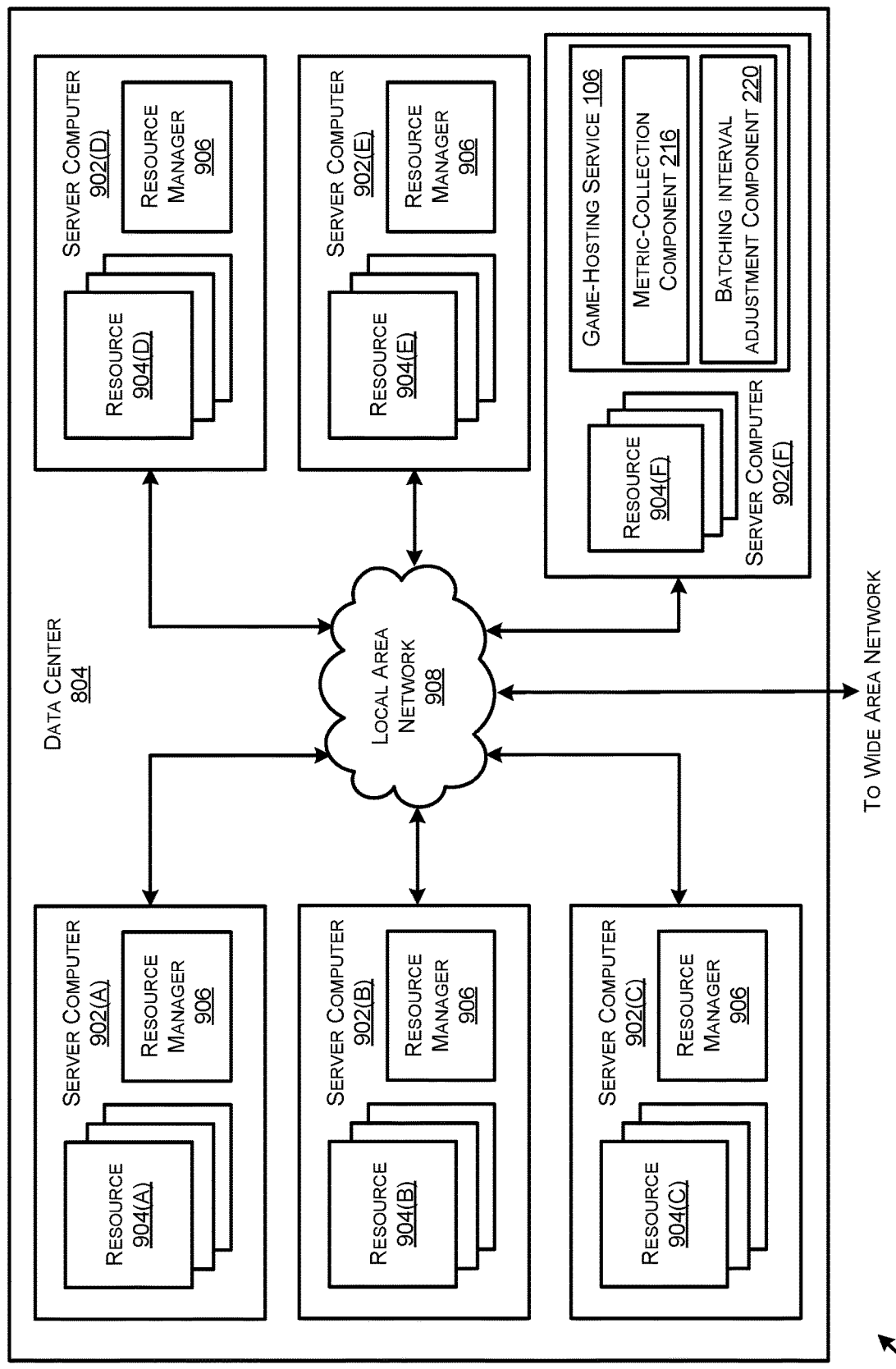
FIG. 9 is a computing system diagram illustrating a configuration for a data center that can be utilized to implement aspects of the technologies disclosed herein.

FIG. 9 is a computing system diagram 900 that illustrates one configuration for a data center 804 that implements aspects of the technologies disclosed herein. The example data center 804 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, be included in, or correspond to, the computing resource network 122 described herein.

The server computers 902 can be standard tower, rack-mount, or blade server computers configured appropriately for providing the computing resources described herein (illustrated in FIG. 9 as the computing resources 904A-904E). As mentioned above, the computing resources provided by the service provider network 102 can be data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 804 can also be configured to provide network services and other types of services.

In the example data center 804 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 902A-902F in each data center 804, and, potentially, between computing resources in each of the server computers 902. It should be appreciated that the configuration of the data center 804 described with reference to FIG. 9 is merely illustrative and that other implementations can be utilized.

The data center 804 shown in FIG. 9 also includes a server computer 902F that can execute some or all of the software components described above. For example, and without limitation, the server computer 902F (and the other server computers 902) can generally correspond to a server configured to execute components of the game-hosting service 106 including, without limitation, the metric-collection component 216 and the batching interval adjustment component 220, and/or the other software components described above. The server computer 902F can also be configured to execute other components and/or to store data for providing some or all of the functionality described herein. In this regard, it should be appreciated that the services illustrated in FIG. 9 as executing on the server computer 902F can execute on many other physical or virtual servers in the data centers 904 in various embodiments. Thus, the data center 804 in FIG. 9 may also include a plurality of server computers 902 that execute a fleet of VM instances 126, which are executing processes to host game sessions for online games.

Figure 10:
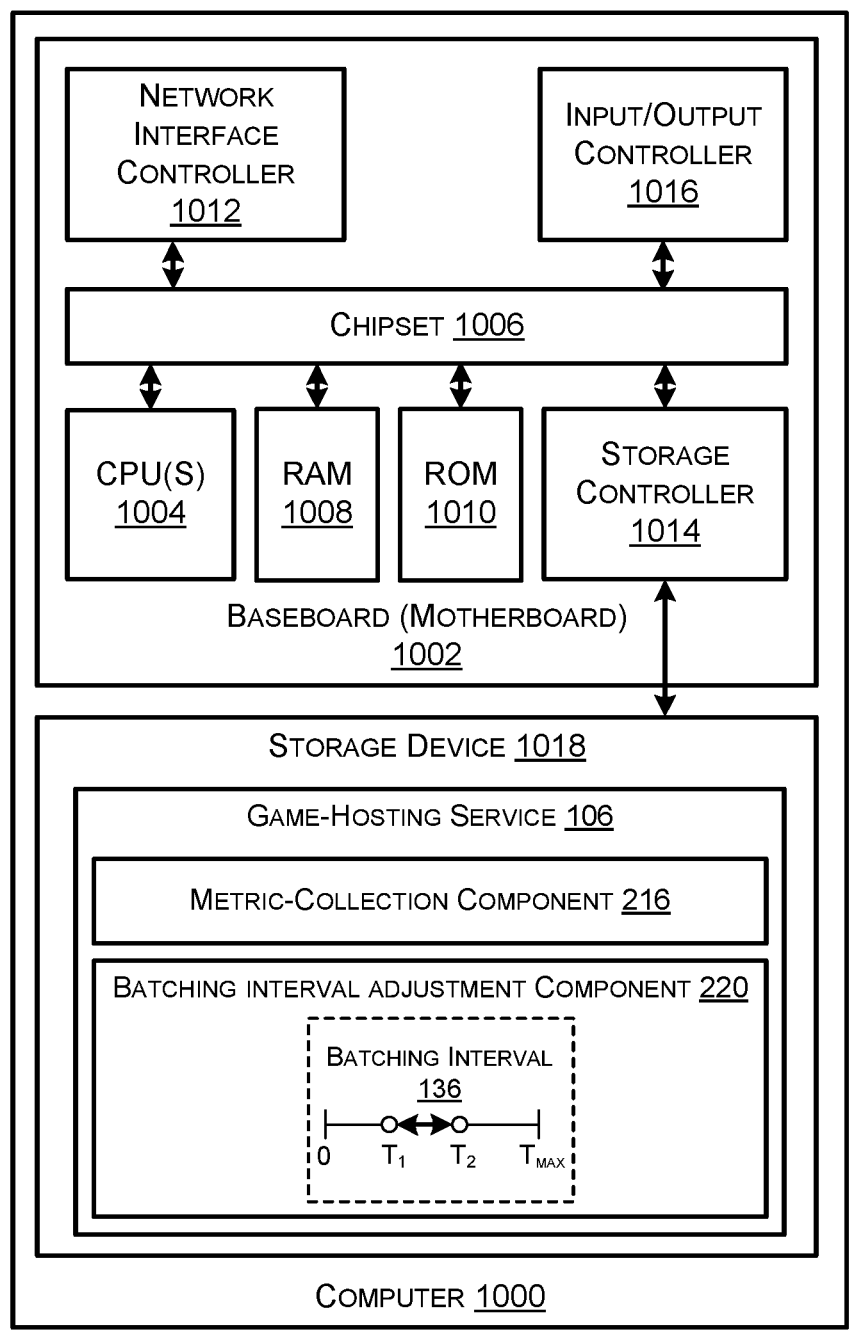
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein. In some examples, the server computer 1000 may correspond to one or more computing devices that implements the game-hosting service 106 described in FIG. 1.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 1000 to other computing devices over the network 908 (or 120). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022 (e.g., the game-hosting service 106 and sub-components thereof, including, without limitation, a metric-collection component 216 and a batching interval adjustment component 220), and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the network-based service platform 102, and or any components included therein, may be supported by one or more devices similar to computer 1000. Stated otherwise, some or all of the operations performed by the service provider network 102, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-7. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As shown in FIG. 10, a metric-collection component 216 may collect contention data 218 and/or other metric values that are utilized to determine how, when, how fast, and/or by how much, to adjust the batching interval 136 that is utilized for assigning processes 132 to game session requests 302. The metric-collection component 216 may be configured to periodically, continuously, etc., collect the contention data 218 and provide the contention data 218 to a batching interval adjustment component 220. The batching interval adjustment component 220 may be configured to, based at least in part on the contention data 218, adjust the batching interval 136 (e.g., by updating batching interval data 214) so that the assignment of processes 132 to game session requests 302 occurs at the updated/adjusted batching interval 136.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
  executing, by one or more computing devices of a game-hosting service associated with a service provider network, multiple first server processes on a fleet of virtual machine instances, the fleet of virtual machine instances being allocated to a subscriber of the service provider network and executing on computing resources of the service provider network;
  performing operations to assign the multiple first server processes to multiple first game session requests over a time period;
  detecting, based on the operations, at least one of a number or a percentage of failed attempts to assign individual ones of the multiple first server processes to the multiple first game session requests, wherein the failed attempts are caused by the individual ones of the multiple first server processes having already been assigned to a game session request;
  determining that the at least one of the number or the percentage of the failed attempts violates a threshold;
  increasing, based on the threshold being violated, a first batching interval from a first period of time to a second period of time that is greater than the first period of time to produce a second batching interval;
  queueing multiple second game session requests received during the second batching interval;
  after a lapse of the second batching interval, querying a data store for a number of second server processes executing on the fleet of virtual machine instances that are idle;
  assigning at least a subset of the second server processes to the multiple second game session requests as assigned server processes; and
  instructing the assigned server processes to host multiple game sessions corresponding to the multiple second game session requests.

2. The computer-implemented method of claim 1, wherein the increasing of the first batching interval comprises:
  increasing the first batching interval from the first period of time to an intermediate period of time to produce an intermediate batching interval, the intermediate period of time being greater than the first period of time and being less than the second period of time;
  determining that the at least one of the number or the percentage of the failed attempts still violates the threshold with the intermediate batching interval;
  increasing the intermediate batching interval from the intermediate period of time to the second period of time to produce the second batching interval;
  determining that the at least one of the number or the percentage of the failed attempts does not violate the threshold with the second batching interval; and
  ceasing to increase the second batching interval based on the at least one of the number or the percentage of the failed attempts not violating the threshold.

3. The computer-implemented method of claim 1, wherein the second period of time represents a highest value of a range of values over which one or more batching intervals are adjustable, the computer-implemented method further comprising:

ceasing to increase the second batching interval based on the second period of time representing the highest value of the range.

4. The computer-implemented method of claim 1, further comprising:

receiving, via a user interface presented on a computing device of the subscriber, user input to adjust a parameter to a value, the value of the parameter indicative of at least one of:

an allowed level of contention allowed during game session placements; or an amount of delay allowed during the game session placements, and setting, based on the value of the parameter, one or more values corresponding to at least one of:

a first rate at which one or more batching intervals are increased based on an increase in a level of contention;

a second rate at which the one or more batching intervals are decreased based on a decrease in the level of contention;

a threshold level of contention that triggers adjustment of the one or more batching intervals; or a range over which the one or more batching intervals are adjustable.

5. A computer-implemented method comprising:

determining, by one or more computing devices of a game-hosting service associated with a service provider network, a level of contention resulting from operations to assign processes to game session requests;

adjusting, based at least in part on the level of contention, a first batching interval from a first period of time to a second period of time to produce a second batching interval;

queueing one or more game session requests received during the second batching interval, the one or more game session requests including at least a first game session request; and after a lapse of the second period of time of the second batching interval, assigning, from available processes that are idle, a first process to the first game session request.

6. The computer-implemented method of claim 5, wherein the determining the level of contention comprises detecting, based at least in part the operations to assign the processes to the game session requests, a number of failed attempts to assign individual ones of the processes to the game session requests over a time period, wherein the failed attempts are caused by the individual ones of the processes already having been assigned to a game session request.

7. The computer-implemented method of claim 5, wherein the determining the level of contention comprises detecting, based at least in part on the operations to assign the processes to the game session requests, a percentage of total attempts to assign individual ones of the processes to the game session requests over a time period that corresponds to failed attempts, wherein the failed attempts are caused by the individual ones of the processes already having been assigned to a game session request.

8. The computer-implemented method of claim 5, further comprising determining that the level of contention violates a threshold level of contention, wherein the adjusting the first batching interval is based at least in part on the level of contention violating the threshold level of contention.

9. The computer-implemented method of claim 8, wherein the adjusting the first batching interval comprises:

increasing the first batching interval from the first period of time to an intermediate period of time to produce an intermediate batching interval, the intermediate period of time being greater than the first period of time and being less than the second period of time;

determining that the level of contention still violates the threshold level of contention with the intermediate batching interval;

increasing the intermediate batching interval from the intermediate period of time to the second period of time to produce the second batching interval;

determining that the level of contention does not violate the threshold level of contention with the second batching interval; and ceasing to increase the second batching interval based at least in part on the level of contention not violating the threshold level of contention.

10. The computer-implemented method of claim 5, wherein the adjusting the first batching interval comprises decreasing the first batching interval incrementally over a time period to the second period of time to produce the second batching interval, the second period of time being less than the first period of time.

11. The computer-implemented method of claim 10, wherein the second period of time represents a lowest value of a range of values over which one or more batching intervals are adjustable.

12. The computer-implemented method of claim 5, wherein the available processes are, prior to the assigning, executing in an idle mode on a fleet of virtual machine instances that are allocated to a subscriber of the service provider network and that are usable to host game sessions for clients of the subscriber.

13. The computer-implemented method of claim 12, further comprising:

receiving, via a user interface presented on a computing device of the subscriber, user input to adjust a parameter to a value, the value of the parameter indicative of at least one of:

an allowed level of contention allowed during game session placements; or an amount of delay allowed during the game session placements, and setting, based at least in part on the value of the parameter, one or more values corresponding to at least one of:

a first rate at which one or more batching intervals are increased based on an increase in the level of contention;

a second rate at which the one or more batching intervals are decreased based on a decrease in the level of contention;

a threshold level of contention that triggers adjustment of the one or more batching intervals; or a range over which the one or more batching intervals are adjustable.

14. The computer-implemented method of claim 5, further comprising, after the lapse of the second period of time of the second batching interval:

prior to the assigning the first process to the first game session request, determining a first number of the available processes that is greater than or equal to a second number of the one or more game session requests; and after the assigning the first process to the first game session request, instructing the first process to host a first game session corresponding to the first game session request.

15. A system comprising:
one or more processors; and
non-transitory computer-readable media storing computer-executable instructions that, when executed by the one or more processors, cause the system to:
  determine a level of contention resulting from operations to assign processes to game session requests;
  adjust, based at least in part on the level of contention, a first batching interval from a first period of time to a second period of time to produce a second batching interval;
  queue one or more game session requests received during the second batching interval, the one or more game session requests including at least a first game session request; and
  after a lapse of the second period of time of the second batching interval, assign, from available processes that are idle, a first process to the first game session request.

16. The system of claim 15, wherein determining the level of contention comprises detecting, based at least in part on the operations to assign the processes to the game session requests, at least one of:
  a number of failed attempts to assign individual ones of the processes to the game session requests over a time period; or
  a percentage of total attempts that are the failed attempts to assign the individual ones of the processes to the game session requests over the time period, or a different time period;
  wherein the failed attempts are caused by the individual ones of the processes already having been assigned to a game session request.

17. The system of claim 15, wherein the computer-executable instructions, when executed by the one or more processors, further cause the system to:
  determine that the level of contention violates a threshold level of contention, and wherein adjusting the first batching interval comprises:
    increasing the first batching interval from the first period of time to an intermediate period of time to produce an intermediate batching interval, the intermediate period of time being greater than the first period of time and being less than the second period of time;
    determining that the level of contention still violates the threshold level of contention with the intermediate batching interval;
    increasing the intermediate batching interval from the intermediate period of time to the second period of time to produce the second batching interval;
    determining that the level of contention does not violate the threshold level of contention with the second batching interval; and
    ceasing to increase the second batching interval based at least in part on the level of contention not violating the threshold level of contention.

18. The system of claim 15, wherein the computer-executable instructions, when executed by the one or more processors, further cause the system to:
  determine that the level of contention violates a threshold level of contention, and wherein adjusting the first batching interval comprises:
    increasing the first batching interval from the first period of time to the second period of time to produce the second batching interval, the second period of time being greater than the first period of time, and the second period of time representing a highest value of a range of values over which one or more batching intervals are adjustable; and
    ceasing to increase the second batching interval based at least in part on the second period of time representing the highest value of the range.

19. The system of claim 15, wherein the computer-executable instructions, when executed by the one or more processors, further cause the system to determine that the level of contention violates a threshold level of contention, and wherein adjusting the first batching interval comprises decreasing the first batching interval incrementally over a time period from the first period of time to the second period of time to produce the second batching interval, the second period of time being less than the first period of time.

20. The system of claim 15, wherein the available processes are, prior to assigning the first process to the first game session request, executing in an idle mode on a fleet of virtual machine instances that are allocated to a subscriber of a service provider network and that are usable to host game sessions for clients of the subscriber.

21. The system of claim 20, wherein the computer-executable instructions, when executed by the one or more processors, further cause the system to:
  receive, via a user interface presented on a computing device of the subscriber, user input to adjust a parameter to a value, the value of the parameter indicative of at least one of:
    an allowed level of contention allowed during game session placements; or
    an amount of delay allowed during the game session placements, and
  set, based at least in part on the value of the parameter, one or more values corresponding to at least one of:
    a first rate at which one or more batching intervals are increased based on an increase in the level of contention;
    a second rate at which the one or more batching intervals are decreased based on a decrease in the level of contention;
    a threshold level of contention that triggers adjustment of the one or more batching intervals; or
    a range over which the one or more batching intervals are adjustable.

* * * * *